(12) United States Patent    (10) Patent No.: US 8,577,022 B2
Nakamura                     (45) Date of Patent:  Nov. 5, 2013

(54) DATA PROCESSING APPARATUS

(75) Inventor: Takatoshi Nakamura, Mie (JP)

(73) Assignee: NTI, Inc., Yokkaichi-shi, Mie (JP)

( * ) Notice: Subject to any disclaimer, the term of this patent is extended or adjusted under 35 U.S.C. 154(b) by 912 days.

(21) Appl. No.: 11/817,304

(22) PCT Filed: Mar. 7, 2006

(86) PCT No.: PCT/JP2006/304836
§ 371 (c)(1),
(2), (4) Date: Jan. 22, 2009

(87) PCT Pub. No.: WO2006/095895
PCT Pub. Date: Sep. 14, 2006

(65) Prior Publication Data
US 2009/0141889 A1    Jun. 4, 2009

(30) Foreign Application Priority Data
Mar. 8, 2005 (JP) .................. 2005-063270

(51) Int. Cl.
*G06F 21/00* (2013.01)
(52) U.S. Cl.
USPC ................ 380/28; 726/3; 713/160; 713/178; 705/64; 380/37; 380/44; 709/231
(58) Field of Classification Search
USPC .................................................. 380/28, 44
See application file for complete search history.

(56) References Cited

U.S. PATENT DOCUMENTS

| 6,259,789 B1 * | 7/2001 | Paone | 380/28 |
| 6,490,353 B1 * | 12/2002 | Tan | 380/37 |
| 7,155,011 B2 * | 12/2006 | Ueda et al. | 380/37 |
| 7,174,019 B2 * | 2/2007 | Okutomi | 380/263 |
| 7,380,120 B1 * | 5/2008 | Garcia | 713/160 |
| 2001/0033654 A1 * | 10/2001 | Wieser | 380/28 |
| 2002/0051535 A1 * | 5/2002 | Ezawa | 380/44 |
| 2002/0118837 A1 * | 8/2002 | Hamilton | 380/277 |
| 2003/0002680 A1 * | 1/2003 | Akiyama et al. | 380/278 |
| 2003/0016820 A1 * | 1/2003 | Volpert, Jr. | 380/37 |

(Continued)

FOREIGN PATENT DOCUMENTS

| JP | 06-216897 | 8/1994 |
| JP | 07-028407 | 1/1995 |

OTHER PUBLICATIONS

International Search Report Dated Apr. 4, 2006.

*Primary Examiner* — Morshed Mehedi

(74) *Attorney, Agent, or Firm* — Michael D. Bednarek; Axinn Veltrop Harkrider LLP

(57) ABSTRACT

To improve encryption technology for a data processing apparatus in order to reduce a possibility of having communication broken by a third party. The data processing apparatus encrypts subject data and renders it as encrypted data to record it on a predetermined recording medium, and decrypts the encrypted data recorded on the recording medium to change it back to the subject data. The encryption is performed in units of plain text cut data generated by cutting the subject data by a predetermined number of bits, where the number of bits of the plain text cut data is varied and dummy data of a size having the number of bits matching with a piece of the plain text cut data of the largest number of bits is mixed with pieces of the plain text cut data other than that of the largest number of bits out of the plain text cut data.

27 Claims, 17 Drawing Sheets

(56) References Cited

U.S. PATENT DOCUMENTS

2003/0065925 A1* 4/2003 Shindo et al. ............... 713/178
2003/0108195 A1* 6/2003 Okada et al. ............... 380/37
2004/0174994 A1* 9/2004 Jiraki ............................ 380/28
2005/0232416 A1* 10/2005 Sonnekalb et al. ............ 380/46

* cited by examiner

DATA PROCESSING APPARATUS

TECHNICAL FIELD

The present invention relates to a data processing apparatus capable of encrypting subject data in plain text to render it as encrypted data and then recording it on a predetermined recording medium and decrypting the encrypted data read from the recording medium as well as applications thereof.

BACKGROUND OF THE INVENTION

As security relating to information is increasingly becoming important nowadays, there is significantly increasing demand for the above-mentioned data processing apparatus capable of encrypting data which should not desirably be known to a third party (herein referred to as "subject data") and recording it on a recording medium. Although various encryption techniques are proposed and put into practical use in order to keep the subject data confidential, it is difficult to completely prevent a code from being broken.

In general, the subject data is encrypted and recorded on a predetermined recording medium by cutting the subject data by a predetermined number of bits and recording encrypted data having encrypted pieces of the cut data connected as one on the predetermined recording medium.

In this case, the data processing apparatus performs encryption or decryption processing in fixed units, such as 8 bits or 16 bits.

Therefore, if such units are known to the outside, there is a higher possibility that an algorithm and key used for the encryption are broken and the contents of the communication are consequently broken.

An existing data processing apparatus performs the encryption or decryption in standardized units, such as 8 bits or 16 bits. Therefore, in the case where the encryption or decryption is performed in the same units as the standardized units, there is a danger that the algorithm and key used for the encryption may be easily broken on another data processing apparatus.

An object of the present invention is to improve a data processing system including two communication apparatuses capable of encrypting the subject data in plain text to render it as encrypted data and then transmitting it to the communication apparatus at the other end and also decrypting received encrypted data and rendering it as the subject data so as to reduce the possibility of having communication broken by a third party.

DISCLOSURE OF THE INVENTION

To achieve the object, the inventors hereof propose first to fifth inventions described below.

A data processing apparatus according to the first invention is as follows.

The data processing apparatus according to the first invention is the one including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; encrypting and decrypting means for encrypting the plain text cut data with the key and the algorithm changing in predetermined timing to render it as the encrypted cut data and decrypting the encrypted cut data with the key and algorithm used when encrypting the encrypted cut data to render it as the plain text cut data; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and specific information recording means for recording specific information for identifying the algorithm used when encrypting the subject data on a predetermined recording medium by associating it with the encrypted data, and wherein: the cutting means cuts the subject data so that at least a piece of the plain text cut data has the number of bits different from the other pieces of the plain text cut data; and when decrypting the encrypted cut data, the encrypting and decrypting means reads the specific information associated with the encrypted data from the specific information recording means, and performs the decryption with the key and the algorithm identified based on the specific information.

When cutting the subject data to generate the plain text cut data, the data processing apparatus causes at least a piece of the plain text cut data to have the number of bits different from the other pieces of the plain text cut data. Therefore, without knowing what unit the encrypted data is encrypted in, a third party cannot decrypt the encrypted data even when the algorithm and key used for the encryption can be known. The data processing apparatus can also cause at least a piece of the plain text cut data and encrypted cut data to have the number of bits different from the other pieces of the plain text cut data or encrypted cut data. Therefore, when trying to break a code, at least a piece of the plain text cut data or encrypted cut data requires a process in a unit different from 8 bits or 16 bits as a general data processing unit so that it is not easily analyzable by a general computer.

Thus, encrypted communication by the data processing apparatus is hardly breakable by a third party.

The above-mentioned data processing apparatus according to the first invention changes the algorithm. However, it may also change the key. It is thereby possible to obtain the same effects as in the above-mentioned case.

For instance, it can be exemplified by a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; encrypting and decrypting means for encrypting the plain text cut data with the algorithm and the key changing in predetermined timing to render it as the encrypted cut data and decrypting the encrypted cut data with the key and algorithm used when encrypting the encrypted cut data to render it as the plain text cut data; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and specific information recording means for recording specific information for identifying the key used when encrypting the subject data on a predetermined recording medium by associating it with the encrypted data, and wherein: the cutting means cuts the subject data so that at least a piece of the plain text cut data has the number of bits different from the other pieces of the plain text cut data; and when decrypting the encrypted cut data, the encrypting and decrypting means reads the specific information associated with the encrypted data from the specific information recording means, and performs the decryption with the algorithm and the key identified based on the specific information.

It is also possible to obtain the same effects as in the above-mentioned first invention by the methods exemplified below.

For instance, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the apparatus including the steps of: cutting the subject data by a predetermined number of bits into multiple pieces of plain text cut data; encrypting the plain text cut data with the key and the algorithm changing in predetermined timing to render it as the encrypted cut data; recording the encrypted data having the encrypted cut data connected as one on the recording medium; recording specific information for identifying the algorithm used when encrypting the subject data on a predetermined recording medium by associating it with the encrypted data; reading the encrypted data recorded on the recording medium from the recording medium; cutting the encrypted data into multiple pieces of encrypted cut data by the same number of bits by which the encrypted data is cut when encrypted; decrypting the encrypted cut data with the key and algorithm used when encrypting the encrypted cut data to render it as the plain text cut data; connecting the decrypted plain text cut data to render it as the subject data; and wherein: the apparatus cuts the subject data so that at least a piece of the plain text cut data has the number of bits different from the other pieces of the plain text cut data, and when decrypting the encrypted cut data, it reads the specific information associated with the encrypted data from the predetermined recording medium and performs the decryption with the key and the algorithm identified based on the specific information.

Or else, it may also be a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the apparatus including the steps of: cutting the subject data by a predetermined number of bits into multiple pieces of plain text cut data; encrypting the plain text cut data with the algorithm and the key changing in predetermined timing to render it as the encrypted cut data, recording the encrypted data having the encrypted cut data connected as one on the recording medium; recording specific information for identifying the key used when encrypting the subject data on a predetermined recording medium by associating it with the encrypted data; reading the encrypted data recorded on the recording medium from the recording medium; cutting the encrypted data into multiple pieces of encrypted cut data by the same number of bits by which the encrypted data is cut when encrypted; decrypting the encrypted cut data with the key and algorithm used when encrypting the encrypted cut data to render it as the plain text cut data; connecting the decrypted plain text cut data to render it as the subject data; and wherein: the apparatus cuts the subject data so that at least a piece of the plain text cut data has the number of bits different from the other pieces of the plain text cut data, and when decrypting the encrypted cut data, it reads the specific information associated with the encrypted data from the predetermined recording medium and performs the decryption with the algorithm and the key identified based on the specific information.

The data processing apparatus according to the first invention can be as follows.

To be more specific, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating solutions which are pseudo-random numbers; encrypting and decrypting means for encrypting the plain text cut data with the key and the algorithm generated based on the solutions to render it as the encrypted cut data and decrypting the encrypted cut data with the key and algorithm used when encrypting the encrypted cut data to render it as the plain text cut data; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and specific information recording means for recording specific information for identifying the algorithm used when encrypting the subject data on a predetermined recording medium by associating it with the encrypted data, and wherein: the cutting means cuts the subject data so that at least a piece of the plain text cut data has the number of bits different from the other pieces of the plain text cut data; and when decrypting the encrypted cut data, the encrypting and decrypting means reads the specific information associated with the encrypted data from the specific information recording means, and performs the decryption with the key and the algorithm identified based on the specific information.

Or else, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating solutions which are pseudo-random numbers; encrypting and decrypting means for encrypting the plain text cut data with the algorithm and the key generated based on the solutions to render it as the encrypted cut data and decrypting the encrypted cut data with the key and algorithm used when encrypting the encrypted cut data to render it as the plain text cut data; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and specific information recording means for recording specific information for identifying the key used when encrypting the subject data on a predetermined recording medium by associating it with the encrypted data, and wherein: the cutting means cuts the subject data so that at least a piece of the plain text cut data has the number of bits different from the other pieces of the plain text cut data; and when decrypting the encrypted cut data, the encrypting and decrypting means reads the specific information associated with the encrypted data from the specific information recording means, and performs the decryption with the algorithm and the key identified based on the specific information.

As these data processing apparatuses generate the algorithm or solutions by using the solutions which are the pseudo-random numbers, it is difficult to analyze the algorithm or solutions so that the possibility of having a code broken becomes lower as a result.

It is possible, by a method exemplified below, to obtain the same effects as those of the two inventions just described.

For instance, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the apparatus including the steps of: sequentially generating solutions which are pseudo-random numbers; cutting the subject data by a predetermined number of bits into multiple pieces of plain text cut data; encrypting the plain text cut data with the key and the algorithm generated based on the solutions to render it as the encrypted cut data; recording the encrypted data having the encrypted cut data connected as one on the recording medium; recording specific information for identifying the algorithm used when encrypting the subject data on a predetermined recording medium by associating it with the encrypted data; reading the encrypted data recorded on the recording medium from the recording medium; cutting the encrypted data into multiple pieces of encrypted cut data by the same number of bits by which the encrypted data is cut when encrypted; decrypting the encrypted cut data with the key and algorithm used when encrypting the encrypted cut data to render it as the plain text cut data; connecting the decrypted plain text cut data to render it as the subject data; and wherein: the apparatus cuts the subject data so that at least a piece of the plain text cut data has the number of bits different from the other pieces of the plain text cut data, and when decrypting the encrypted cut data, it reads the specific information associated with the encrypted data from the predetermined recording medium and performs the decryption with the key and the algorithm identified based on the specific information.

Or else, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the apparatus including the steps of: sequentially generating solutions which are pseudo-random numbers; cutting the subject data by a predetermined number of bits into multiple pieces of plain text cut data; encrypting the plain text cut data with the algorithm and the key generated based on the solutions to render it as the encrypted cut data; recording the encrypted data having the encrypted cut data connected as one on the recording medium; recording specific information for identifying the key used when encrypting the subject data on a predetermined recording medium by associating it with the encrypted data; reading the encrypted data recorded on the recording medium from the recording medium; cutting the encrypted data into multiple pieces of encrypted cut data by the same number of bits by which the encrypted data is cut when encrypted; decrypting the encrypted cut data with the key and algorithm used when encrypting the encrypted cut data to render it as the plain text cut data; connecting the decrypted plain text cut data to render it as the subject data; and wherein: the apparatus cuts the subject data so that at least a piece of the plain text cut data has the number of bits different from the other pieces of the plain text cut data, and when decrypting the encrypted cut data, it reads the specific information associated with the encrypted data from the predetermined recording medium and performs the decryption with the algorithm and the key identified based on the specific information.

The data processing apparatus of the first invention may comprise mixing means for including dummy data irrelevant to the subject data in pieces of the plain text cut data except a piece of the largest number of bits thereof and thereby matching the number of bits of every piece of the plain text cut data with the number of bits of the piece of the largest number of bits of the plain text cut data. Thus, on the data processing apparatus. All the bit numbers of the plain text cut data or the encrypted cut data as a unit of encryption or decryption match, and so it becomes easier to perform the encryption or decryption processing. On the other hand, a third party cannot know which data is the original plain text cut data or encrypted cut data and which data is the dummy data so that the possibility of having the code broken remains low.

The data processing apparatus according to the second invention can be as follows.

To be more specific, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; encrypting and decrypting means for encrypting the plain text cut data with the algorithm and the key changing in predetermined timing to render it as the encrypted cut data and decrypting the encrypted cut data with the key and algorithm used when encrypting the encrypted cut data to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and specific information recording means for recording specific information for identifying the algorithm used when encrypting the subject data on a predetermined recording medium by associating it with the encrypted data, and wherein: the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data; and when decrypting the encrypted cut data, the encrypting and decrypting means reads the specific information associated with the encrypted data from the specific information recording means, and performs the decryption with the key and the algorithm identified based on the specific information.

The cutting means of this data processing apparatus cuts the subject data by the number of bits shorter than the standard number of bits. However, the standard number of bits may be 8 bits or 16 bits which is the same as a general data processing unit for instance. Thus, when trying to break a code, at least a piece of the plain text cut data or encrypted cut data requires a process in a processing unit different from 8 bits or 16 bits as a general data processing unit so that it is not easily analyzable by a general computer. This data processing apparatus comprises the mixing means for matching the number of bits of the plain text cut data with the standard number of bits by including the dummy data irrelevant to the subject data in the plain text cut data. Therefore, this data processing apparatus is consequently able to perform the encryption and decryption processing in the processing unit used by a general computer so that there is no need to change its hardware configuration from a conventional one. On the other hand, a third party cannot know which data is the original plain text cut data or encrypted cut data and which data is the dummy data so that the possibility of having the code broken remains low.

While the above-mentioned data processing apparatus changes the algorithm, it may also be the one for changing the key.

For instance, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; encrypting and decrypting means for encrypting the plain text cut data with the algorithm and the key changing in predetermined timing to render it as the encrypted cut data and decrypting the encrypted cut data with the key and algorithm used when encrypting the encrypted cut data to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and specific information recording means for recording specific information for identifying the key used when encrypting the subject data on a predetermined recording medium by associating it with the encrypted data, and wherein: the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data; and when decrypting the encrypted cut data, the encrypting and decrypting means reads the specific information associated with the encrypted data from the specific information recording means, and performs the decryption with the algorithm and the key identified based on the specific information.

It is also possible to obtain the effects of the data processing apparatuses of the second invention by the methods exemplified below.

For instance, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the apparatus including the steps of: cutting the subject data by a predetermined number of bits into multiple pieces of plain text cut data; encrypting the plain text cut data with the key and the algorithm changing in predetermined timing per standard number of bits as a standard to render it as the encrypted cut data; recording the encrypted data having the encrypted cut data connected as one on the recording medium; recording specific information for identifying the algorithm used when encrypting the subject data on a predetermined recording medium by associating it with the encrypted data; reading the encrypted data recorded on the recording medium from the recording medium; cutting the encrypted data into multiple pieces of encrypted cut data by the same number of bits by which the encrypted data is cut when encrypted; decrypting the encrypted cut data with the key and algorithm used when encrypting the encrypted cut data per the standard number of bits to render it as the plain text cut data; connecting the decrypted plain text cut data to render it as the subject data; and wherein: the apparatus cuts the subject data by the number of bits shorter than the standard number of bits and matches the number of bits of the plain text cut data with the standard number of bits by including dummy data irrelevant to the subject data in the plain text cut data, and when decrypting the encrypted cut data, it reads the specific information associated with the encrypted data from the predetermined recording medium and performs the decryption with the key and the algorithm identified based on the specific information.

Or else, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the apparatus including the steps of: cutting the subject data by a predetermined number of bits into multiple pieces of plain text cut data; encrypting the plain text cut data with the algorithm and the key changing in predetermined timing per standard number of bits as a standard to render it as the encrypted cut data; recording the encrypted data having the encrypted cut data connected as one on the recording medium; recording specific information for identifying the key used when encrypting the subject data on a predetermined recording medium by associating it with the encrypted data; reading the encrypted data recorded on the recording medium from the recording medium; cutting the encrypted data into multiple pieces of encrypted cut data by the same number of bits by which the encrypted data is cut when encrypted; decrypting the encrypted cut data with the key and algorithm used when encrypting the encrypted cut data per the standard number of bits as a standard to render it as the plain text cut data; connecting means for connecting the decrypted plain text cut data to render it as the subject data; and wherein: the apparatus cuts the subject data by the number of bits shorter than the standard number of bits and matches the number of bits of the plain text cut data with the standard number of bits by including dummy data irrelevant to the subject data in the plain text cut data, and when decrypting the encrypted cut data, it reads the specific information associated with the encrypted data from the predetermined recording medium and performs the decryption with the algorithm and the key identified based on the specific information.

The data processing apparatus of the second invention can be as follows.

To be more specific, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating solutions which are pseudo-random numbers; encrypting and decrypting means for encrypting the plain text cut data with the key and the algorithm generated based on the solutions to render it as the encrypted cut data and decrypting the encrypted cut data with the key and algorithm used when encrypting the encrypted cut data to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and specific information recording means for recording specific information for identifying the algorithm used when encrypting the subject data on a predetermined recording medium by associating it with the encrypted data, and mixing means for matching the number of bits of the plain text cut data with the standard number of bits by including dummy data irrelevant to the subject data in the plain text cut data; and wherein: the cutting means cuts the subject data by the number of bits shorter than the standard number of bits; and when decrypting the encrypted cut data, the encrypting and decrypting means reads the specific information associated with the encrypted data from the specific information recording means, and performs the decryption with the key and the algorithm identified based on the specific information.

Or else, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating solutions which are pseudo-random numbers; encrypting and decrypting means for encrypting the plain text cut data with the algorithm and the key generated based on the solutions to render it as the encrypted cut data and decrypting the encrypted cut data with the key and algorithm used when encrypting the encrypted cut data to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and specific information recording means for recording specific information for identifying the key used when encrypting the subject data on a predetermined recording medium by associating it with the encrypted data, and mixing means for matching the number of bits of the plain text cut data with the standard number of bits by including dummy data irrelevant to the subject data in the plain text cut data; and wherein: the cutting means cuts the subject data by the number of bits shorter than the standard number of bits; and when decrypting the encrypted cut data, the encrypting and decrypting means reads the specific information associated with the encrypted data from the specific information recording means, and performs the decryption with the algorithm and the key identified based on the specific information.

As these data processing apparatuses generate the algorithm or solutions by using the solutions which are the pseudo-random numbers, it is difficult to analyze the algorithm or solutions so that the possibility of having a code broken becomes lower as a result.

It is possible, by a method exemplified below, to obtain the same effects as those of the two second inventions just described.

For instance, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the apparatus including the steps of: sequentially generating solutions which are pseudo-random numbers; cutting the subject data by a predetermined number of bits into multiple pieces of plain text cut data; encrypting the plain text cut data with the key and the algorithm generated based on the solutions per standard number of bits as a standard to render it as the encrypted cut data; matching the number of bits of the plain text cut data with the standard number of bits by including dummy data irrelevant to the subject data in the plain text cut data; recording the encrypted data having the encrypted cut data connected as one on the recording medium; recording specific information for identifying the algorithm used when encrypting the subject data on a predetermined recording medium by associating it with the encrypted data; reading the encrypted data recorded on the recording medium from the recording medium; cutting the encrypted data into multiple pieces of encrypted cut data by the same number of bits by which the encrypted data is cut when encrypted; decrypting the encrypted cut data with the key and algorithm used when encrypting the encrypted cut data per the standard number of bits to render it as the plain text cut data; connecting the decrypted plain text cut data to render it as the subject data; and wherein: the apparatus cuts the subject data by the number of bits shorter than the standard number of bits so that at least a piece of the plain text cut data has the number of bits different from the other pieces of the plain text cut data, and when decrypting the encrypted cut data, it reads the specific information associated with the encrypted data from the predetermined recording medium and performs the decryption with the key and the algorithm identified based on the specific information.

It may also be a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the apparatus including the steps of: sequentially generating solutions which are pseudo-random numbers; cutting the subject data by a predetermined number of bits into multiple pieces of plain text cut data; encrypting the plain text cut data with the algorithm and the key generated based on the solutions per standard number of bits as a standard to render it as the encrypted cut data; matching the number of bits of the plain text cut data with the standard number of bits by including dummy data irrelevant to the subject data in the plain text cut data; recording the encrypted data having the encrypted cut data connected as one on the recording medium; recording specific information for identifying the key used when encrypting the subject data on a predetermined recording medium by associating it with the encrypted data; reading the encrypted data recorded on the recording medium from the recording medium; cutting the encrypted data into multiple pieces of encrypted cut data by the same number of bits by which the encrypted data is cut when encrypted; decrypting the encrypted cut data with the algorithm and key used when encrypting the encrypted cut data per the standard number of bits to render it as the plain text cut data; connecting the decrypted plain text cut data to render it as the subject data; and wherein: the apparatus cuts the subject data by the number of bits shorter than the standard number of bits so that at least a piece of the plain text cut data has the number of bits different from the other pieces of the plain text cut data, and when decrypting the encrypted cut data, it reads the specific information associated with the encrypted data from the predetermined recording medium and performs the decryption with the algorithm and the key identified based on the specific information.

In the case of cutting the subject data by the number of bits shorter than the standard number of bits, the cutting means of the data processing apparatus of the second invention may either cut the subject data by a predetermined number of bits or cut it by different numbers of bits. The processing is easier in the former case while the possibility of having the code broken is lower in the latter case.

In the case where the cutting means cuts the subject data by the predetermined number of bits shorter than the standard number of bits, the mixing means may either include the dummy data at a same position of the plain text cut data or include the dummy data at a different predetermined position for each piece of the plain text cut data. The processing is easier in the former case while the possibility of having the code broken is lower in the latter case.

The solution generating means of the second invention may either generate the solution each time the subject data is encrypted and the encrypted data is decrypted or generate the solution each time the plain text cut data is encrypted and the encrypted cut data is decrypted.

In the case where the second invention has the solution generating means, the mixing means of the second invention may decide the predetermined position for including the dummy data based on the solution, and the cutting means of the second invention may cut the subject data based on the solution so that at least a piece of the plain text cut data has the number of bits different from the other pieces of the plain text cut data.

The third invention is as follows.

The third invention is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating new solutions each time the subject data is encrypted by assigning past solutions to a predetermined solution generating algorithm capable of generating a new solution by assigning at least one of the past solutions thereto; first algorithm generating means for sequentially generating new algorithms each time the subject data is encrypted by using the generated solutions; second algorithm generating means for sequentially generating the same new algorithms as those generated by the first algorithm generating means each time the encrypted data is decrypted by using the generated solutions; encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data so that at least a piece of the plain text cut data has the number of bits different from the other pieces of the plain text cut data.

Or else, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating new solutions each time the subject data is encrypted by assigning past solutions to a predetermined solution generating algorithm capable of generating a new solution by assigning at least one of the past solutions thereto; first key generating means for sequentially generating new keys each time the subject data is encrypted by using the generated solutions; second key generating means for sequentially generating the same new keys as those generated by the first key generating means each time the encrypted data is decrypted by using the generated solutions; encrypting and decrypting means for encrypting the plain text cut data with the algorithm and the key generated by the first key generating means to render it as the encrypted cut data and decrypting the encrypted cut data with the algorithm used when encrypting the encrypted cut data and the same key as that used when encrypting the encrypted data generated by the second key generating means to render it as the plain text cut data; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data so that at least a piece of the plain text cut data has the number of bits different from the other pieces of the plain text cut data.

The data processing apparatus of the third invention is similar to that of the first invention. It is different from the data processing apparatus of the first invention, however, in that it does not use the specific information for identifying the algorithm or key used when encrypting the subject data. This is related to the fact that the data processing apparatus of the third invention encrypts multiple pieces of the subject data to render them as the encrypted data and decrypts multiple pieces of the encrypted data in the same order as the order used on the encryption thereof.

The algorithm generating means and the key generating means of the data processing apparatus of the third invention generate the algorithm and the key each time the subject data is encrypted respectively. And when performing the decryption, the data processing apparatus of the third invention generates the same algorithm and the key as those used when performing the encryption.

Therefore, the data processing apparatus of the third invention sequentially generates the same algorithms or keys as those generated in the past, and so it does not need to use the above-mentioned specific information if only it decrypts the multiple pieces of the encrypted data in the same order as the order used on the encryption thereof.

It is also possible to obtain the same effects as those of the above-mentioned third invention by the following methods for instance.

To be more specific, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a step of sequentially generating new solutions each time the subject data is encrypted by assigning past solutions to a predetermined solution generating algorithm capable of generating a new solution by assigning at least one of the past solutions thereto; a first algorithm generating step of sequentially generating new algorithms each time the subject data is encrypted by using the generated solutions; a step of encrypting the plain text cut data with the key and the algorithm generated in the first algorithm generating step to render it as the encrypted cut data; a step of recording the encrypted data having the encrypted cut data connected as one on the recording medium; a step of reading the encrypted data recorded on the recording medium from the recording medium; a second algorithm generating step of sequentially generating the same new algorithms as those generated in the first algorithm generating step each time the encrypted data is decrypted by using the generated solutions; a step of cutting the encrypted data into multiple pieces of encrypted cut data by the same number of bits by which the encrypted data is cut when encrypted; a step of decrypting the encrypted cut data with the key used when encrypting the encrypted cut data and the same algorithm as that used when encrypting the encrypted data generated in the second algorithm generating step to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data so that at least a piece of the plain text cut data has the number of bits different from the other pieces of the plain text cut data.

Or else, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a step of sequentially generating new solutions each time the subject data is encrypted by assigning past solutions to a predetermined solution generating algorithm capable of generating a new solution by assigning at least one of the past solutions thereto; a first key generating step of sequentially generating new keys each time the subject data is encrypted by using the generated solutions; a step of encrypting the plain text cut data with the algorithm and the key generated in the first key generating step to render it as the encrypted cut data; a step of recording the encrypted data having the encrypted cut data connected as one on the recording medium; a step of reading the encrypted data recorded on the recording medium from the recording medium; a second key generating step of sequentially generating the same new keys as those generated in the first key generating step each time the encrypted data is decrypted by using the generated solutions; a step of cutting the encrypted data into multiple pieces of encrypted cut data by the same number of bits by which the encrypted data is cut when encrypted; a step of decrypting the encrypted cut data with the algorithm used when encrypting the encrypted cut data and the same key as that used when encrypting the encrypted data generated in the second key generating step to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data so that at least a piece of the plain text cut data has the number of bits different from the other pieces of the plain text cut data.

The third invention can be as follows.

For instance, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; first solution generating means for sequentially generating new solutions each time the subject data is encrypted by assigning past solutions to a predetermined solution generating algorithm capable of generating a new solution by assigning at least one of the past solutions thereto; first algorithm generating means for sequentially generating new algorithms each time the subject data is encrypted by using the solutions generated by the first solution generating means; second solution generating means for sequentially generating the same new solutions as those generated by the first solution generating means each time the encrypted data is decrypted by assigning the past solutions to a predetermined solution generating algorithm capable of generating a new solution by assigning at least one of the past solutions thereto; second algorithm generating means for sequentially generating the same new algorithms as those generated by the first algorithm generating means each time the encrypted data is decrypted by using the solutions generated by the second solution generating means; encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data so that at least a piece of the plain text cut data has the number of bits different from the other pieces of the plain text cut data.

Or else, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; first solution generating means for sequentially generating new solutions each time the subject data is encrypted by assigning past solutions to a predetermined solution generating algorithm capable of generating a new solution by assigning at least one of the past solutions thereto; first key generating means for sequentially generating new keys each time the subject data is encrypted by using the solutions generated by the first solution generating means; second solution generating means for sequentially generating the same new solutions as those generated by the first solution generating means each time the encrypted data is decrypted by assigning the past solutions to a predetermined solution generating algorithm capable of generating a new solution by assigning at least one of the past solutions thereto; second key generating means for sequentially generating the same new keys as those generated by the first key generating means each time the encrypted data is decrypted by using the solutions generated by the second solution generating means; encrypting and decrypting means for encrypting the plain text cut data with the algorithm and the key generated by the first key generating means to render it as the encrypted cut data and decrypting the encrypted cut data with the algorithm used when encrypting the encrypted cut data and the same key as that used when encrypting the encrypted data generated by the second key generating means to render it as the plain text cut data; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data so that at least a piece of the plain text cut data has the number of bits different from the other pieces of the plain text cut data.

These data processing apparatuses are different from the two data processing apparatuses previously shown in that there are two solution generating means corresponding to the first algorithm generating means and second algorithm generating means or the first key generating means and second key generating means. It is thereby possible to obtain the same effects as those of the two data processing apparatuses previously shown.

It is possible, by the two data processing methods exemplified below, to obtain the same effects as those of the two data processing apparatuses just described.

To be more specific, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a first solution generating step of sequentially generating new solutions each time the subject data is encrypted by assigning past solutions to a predetermined solution generating algorithm capable of generating a new solution by assigning at least one of the past solutions thereto; a first algorithm generating step of sequentially generating new algorithms each time the subject data is encrypted by using the solutions generated in the first solution generating step; a step of encrypting the plain text cut data with the key and the algorithm generated in the first algorithm generating step to render it as the encrypted cut data; a step of recording the encrypted data having the encrypted cut data connected as one on the recording medium; a step of reading the encrypted data recorded on the recording medium from the recording medium; a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto; a second algorithm generating step of sequentially generating the same new algorithms as those generated in the first algorithm generating step each time the encrypted data is decrypted by using the solutions generated in the second solution generating step; a step of cutting the encrypted data into multiple pieces of encrypted cut data by the same number of bits by which the encrypted data is cut when encrypted; a step of decrypting the encrypted cut data with the key used when encrypting the encrypted cut data and the same algorithm as that used when encrypting the encrypted data generated in the second algorithm generating step to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data so that at least a piece of the plain text cut data has the number of bits different from the other pieces of the plain text cut data.

Or else, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a first solution generating step of sequentially generating new solutions each time the subject data is encrypted by assigning past solutions to a predetermined solution generating algorithm capable of generating a new solution by assigning at least one of the past solutions thereto; a first key generating step of sequentially generating new keys each time the subject data is encrypted by using the solutions generated in the first solution generating step; a step of encrypting the plain text cut data with the algorithm and the key generated in the first key generating step to render it as the encrypted cut data; a step of recording the encrypted data having the encrypted cut data connected as one on the recording medium; a step of reading the encrypted data recorded on the recording medium from the recording medium; a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto; a second key generating step of sequentially generating the same new keys as those generated in the first key generating step each time the encrypted data is decrypted by using the solutions generated in the second solution generating step; a step of cutting the encrypted data into multiple pieces of encrypted cut data by the same number of bits by which the encrypted data is cut when encrypted; a step of decrypting the encrypted cut data with the algorithm used when encrypting the encrypted cut data and the same key as that used when encrypting the encrypted data generated in the second key generating step to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data so that at least a piece of the plain text cut data has the number of bits different from the other pieces of the plain text cut data.

The fourth invention is as follows.

To be more specific, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating new solutions each time the subject data is encrypted by assigning past solutions to a predetermined solution generating algorithm capable of generating a new solution by assigning at least one of the past solutions thereto; first algorithm generating means for sequentially generating new algorithms each time the subject data is encrypted by using the generated solutions; second algorithm generating means for sequentially generating the same new algorithms as those generated by the first algorithm generating means each time the encrypted data is decrypted by using the generated solutions; encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data.

Or else, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating new solutions each time the subject data is encrypted by assigning past solutions to a predetermined solution generating algorithm capable of generating a new solution by assigning at least one of the past solutions thereto; first key generating means for sequentially generating new keys each time the subject data is encrypted by using the generated solutions; second key generating means for sequentially generating the same new keys as those generated by the first key generating means each time the encrypted data is decrypted by using the generated solutions; encrypting and decrypting means for encrypting the plain text cut data with the algorithm and the key generated by the first key generating means to render it as the encrypted cut data and decrypting the encrypted cut data with the algorithm used when encrypting the encrypted cut data and the same key as that used when encrypting the encrypted data generated by the second key generating means to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data.

It is possible, by the methods exemplified below, to obtain the same effects as those of the above-described fourth invention.

To be more specific, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a step of sequentially generating new solutions each time the subject data is encrypted by assigning past solutions to a predetermined solution generating algorithm capable of generating a new solution by assigning at least one of the past solutions thereto; a first algorithm generating step of sequentially generating new algorithms each time the subject data is encrypted by using the generated solutions; a step of matching the number of bits of the plain text cut data with the standard number of bits as a standard by including dummy data irrelevant to the subject data in the plain text cut data; a step of encrypting the plain text cut data with the key and the algorithm generated in the first algorithm generating step per standard number of bits to render it as the encrypted cut data; a step of recording the encrypted data having the encrypted cut data connected as one on the recording medium; a step of reading the encrypted data recorded on the recording medium from the recording medium; a second algorithm generating step of sequentially generating the same new algorithms as those generated in the first algorithm generating step each time the encrypted data is decrypted by using the generated solutions; a step of cutting the encrypted data into multiple pieces of encrypted cut data by the same number of bits by which the encrypted data is cut when encrypted; a step of decrypting the encrypted cut data with the key used when encrypting the encrypted cut data and the same algorithm as that used when encrypting the encrypted data generated in the second algorithm generating step per standard number of bits to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data by the number of bits shorter than the standard number of bits.

Or else, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a step of sequentially generating new solutions each time the subject data is encrypted by assigning past solutions to a predetermined solution generating algorithm capable of generating a new solution by assigning at least one of the past solutions thereto; a first key generating step of sequentially generating new keys each time the subject data is encrypted by using the generated solutions; a step of matching the number of bits of the plain text cut data with the standard number of bits as a standard by including dummy data irrelevant to the subject data in the plain text cut data; a step of encrypting the plain text cut data with the algorithm and the key generated in the first key generating step per standard number of bits to render it as the encrypted cut data; a step of recording the encrypted data having the encrypted cut data connected as one on the recording medium; a step of reading the encrypted data recorded on the recording medium from the recording medium; a second key generating step of sequentially generating the same new keys as those generated in the first key generating step each time the encrypted data is decrypted by using the generated solutions; a step of cutting the encrypted data into multiple pieces of encrypted cut data by the same number of bits by which the encrypted data is cut when encrypted; a step of decrypting the encrypted cut data with the algorithm used when encrypting the encrypted cut data and the same key as that used when encrypting the encrypted data generated in the second key generating step per standard number of bits to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data by the number of bits shorter than the standard number of bits.

The data processing apparatus according to the fourth invention is similar to that of the second invention. It is different in that it does not have the specific information recording means. The reason that the data processing apparatus according to the fourth invention does not have the specific information recording means is the same as the reason that the data processing apparatus according to the third invention does not have it.

The fourth invention may also have two solution generating means as with the third invention. It is as follows.

A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; first solution generating means for sequentially generating new solutions each time the subject data is encrypted by assigning past solutions to a predetermined solution generating algorithm capable of generating a new solution by assigning at least one of the past solutions thereto; first algorithm generating means for sequentially generating new algorithms each time the subject data is encrypted by using the solutions generated by the first solution generating means; second solution generating means for sequentially generating the same new solutions as those generated by the first solution generating means each time the encrypted data is decrypted by assigning past solutions to a predetermined solution generating algorithm capable of generating a new solution by assigning at least one of the past solutions thereto; second algorithm generating means for sequentially generating the same new algorithms as those generated by the first algorithm generating means each time the encrypted data is decrypted by using the solutions generated by the second solution generating means; encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data.

Or else, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; first solution generating means for sequentially generating new solutions each time the subject data is encrypted by assigning past solutions to a predetermined solution generating algorithm capable of generating a new solution by assigning at least one of the past solutions thereto; first key generating means for sequentially generating new keys each time the subject data is encrypted by using the solutions generated by the first solution generating means; second solution generating means for sequentially generating the same new solutions as those generated by the first solution generating means each time the encrypted data is decrypted by assigning past solutions to a predetermined solution generating algorithm capable of generating a new solution by assigning at least one of the past solutions thereto; second key generating means for sequentially generating the same new keys as those generated by the first key generating means each time the encrypted data is decrypted by using the solutions generated by the second solution generating means; encrypting and decrypting means for encrypting the plain text cut data with the algorithm and the key generated by the first key generating means to render it as the encrypted cut data and decrypting the encrypted cut data with the algorithm used when encrypting the encrypted cut data and the same key as that used when encrypting the encrypted data generated by the second key generating means to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data.

It is possible, by the method exemplified below, to obtain the same effects as those of the two data processing apparatuses just described.

To be more specific, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a first solution generating step of sequentially generating new solutions each time the subject data is encrypted by assigning past solutions to a predetermined solution generating algorithm capable of generating a new solution by assigning at least one of the past solutions thereto; a step of matching the number of bits of the plain text cut data with the standard number of bits as a standard by including dummy data irrelevant to the subject data in the plain text cut data; a first algorithm generating step of sequentially generating new algorithms each time the subject data is encrypted by using the solutions generated in the first solution generating step; step of encrypting the plain text cut data with the key and the algorithm generated in the first algorithm generating step per standard number of bits to render it as the encrypted cut data; a step of recording the encrypted data having the encrypted cut data connected as one on the recording medium; a step of reading the encrypted data recorded on the recording medium from the recording medium; a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto; a second algorithm generating step of sequentially generating the same new algorithms as those generated in the first algorithm generating step each time the encrypted data is decrypted by using the solutions generated in the second solution generating step; a step of cutting the encrypted data into multiple pieces of encrypted cut data by the same number of bits by which the encrypted data is cut when encrypted; a step of decrypting the encrypted cut data with the key used when encrypting the encrypted cut data and the same algorithm as that used when encrypting the encrypted data generated in the second algorithm generating step per standard number of bits to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data by the number of bits shorter than the standard number of bits.

Or else, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a first solution generating step of sequentially generating new solutions each time the subject data is encrypted by assigning past solutions to a predetermined solution generating algorithm capable of generating a new solution by assigning at least one of the past solutions thereto; a first key generating step of sequentially generating new keys each time the subject data is encrypted by using the solutions generated in the first solution generating step; a step of matching the number of bits of the plain text cut data with the standard number of bits as a standard by including dummy data irrelevant to the subject data in the plain text cut data; a step of encrypting the plain text cut data with the algorithm and the key generated in the first key generating step per standard number of bits to render it as the encrypted cut data; a step of recording the encrypted data having the encrypted cut data connected as one on the recording medium; a step of reading the encrypted data recorded on the recording medium from the recording medium; a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto; a second key generating step of sequentially generating the same new keys as those generated in the first key generating step each time the encrypted data is decrypted by using the solutions generated in the second solution generating step; a step of cutting the encrypted data into multiple pieces of encrypted cut data by the same number of bits by which the encrypted data is cut when encrypted; a step of decrypting the encrypted cut data with the algorithm used when encrypting the encrypted cut data and the same key as that used when encrypting the encrypted data generated in the second key generating step per standard number of bits to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data by the number of bits shorter than the standard number of bits.

The data processing apparatus of the fourth invention can be as follows.

To be more specific, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating new solutions each time the subject data is encrypted by assigning past solutions to a predetermined solution generating algorithm capable of generating a new solution by assigning at least one of the past solutions thereto; first algorithm generating means for sequentially generating new algorithms each time the subject data is encrypted by using the generated solutions; second algorithm generating means for sequentially generating the same new algorithms as those generated by the first algorithm generating means each time the encrypted data is decrypted by using the generated solutions; encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data by the number of bits shorter than the standard number of bits so that at least a piece of the subject data has the number of bits different from the other pieces of the subject data; and having mixing means provided for the sake of matching the number of bits of the plain text cut data with the standard number of bits by including dummy data irrelevant to the subject data in the plain text cut data.

Or else, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating new solutions each time the subject data is encrypted by assigning past solutions to a predetermined solution generating algorithm capable of generating a new solution by assigning at least one of the past solutions thereto; first key generating means for sequentially generating new keys each time the subject data is encrypted by using the generated solutions; second key generating means for sequentially generating the same new keys as those generated by the first key generating means each time the encrypted data is decrypted by using the generated solutions; encrypting and decrypting means for encrypting the plain text cut data with the algorithm and the key generated by the first key generating means to render it as the encrypted cut data and decrypting the encrypted cut data with the algorithm used when encrypting the encrypted cut data and the same key as that used when encrypting the encrypted data generated by the second key generating means to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data by the number of bits shorter than the standard number of bits so that at least a piece of the subject data has the number of bits different from the other pieces of the subject data; and having mixing means provided for the sake of matching the number of bits of the plain text cut data with the standard number of bits by including dummy data irrelevant to the subject data in the plain text cut data.

It is also possible, by the method exemplified below, to obtain the same effects as those of the two data processing apparatuses just described.

To be more specific, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a step of sequentially generating new solutions each time the subject data is encrypted by assigning past solutions to a predetermined solution generating algorithm capable of generating a new solution by assigning at least one of the past solutions thereto; a first algorithm generating step of sequentially generating new algorithms each time the subject data is encrypted by using the generated solutions; a step of matching the number of bits of the plain text cut data with the standard number of bits as a standard by including dummy data irrelevant to the subject data in the plain text cut data; a step of encrypting the plain text cut data with the key and the algorithm generated in the first algorithm generating step per standard number of bits to render it as the encrypted cut data; a step of recording the encrypted data having the encrypted cut data connected as one on the recording medium; a step of reading the encrypted data recorded on the recording medium from the recording medium; a second algorithm generating step of sequentially generating the same new algorithms as those generated in the first algorithm generating step each time the encrypted data is decrypted by using the generated solutions; a step of cutting the encrypted data into multiple pieces of encrypted cut data by the same number of bits by which the encrypted data is cut when encrypted; a step of decrypting the encrypted cut data with the key used when encrypting the encrypted cut data and the same algorithm as that used when encrypting the encrypted data generated in the second algorithm generating step per standard number of bits to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data to have the number of bits shorter than the standard number of bits so that at least a piece of the plain text cut data has the number of bits different from the other pieces of the plain text cut data.

Or else, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a step of sequentially generating new solutions each time the subject data is encrypted by assigning past solutions to a predetermined solution generating algorithm capable of generating a new solution by assigning at least one of the past solutions thereto; a first key generating step of sequentially generating new keys each time the subject data is encrypted by using the generated solutions; a step of matching the number of bits of the plain text cut data with the standard number of bits as a standard by including dummy data irrelevant to the subject data in the plain text cut data; a step of encrypting the plain text cut data with the algorithm and the key generated in the first key generating step per standard number of bits to render it as the encrypted cut data; a step of recording the encrypted data having the encrypted cut data connected as one on the recording medium; a step of reading the encrypted data recorded on the recording medium from the recording medium; a second key generating step of sequentially generating the same new keys as those generated in the first key generating step each time the encrypted data is decrypted by using the generated solutions; a step of cutting the encrypted data into multiple pieces of encrypted cut data by the same number of bits by which the encrypted data is cut when encrypted; a step of decrypting the encrypted cut data with the algorithm used when encrypting the encrypted cut data and the same key as that used when encrypting the encrypted data generated in the second key generating step per standard number of bits to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data to have the number of bits shorter than the standard number of bits so that at least a piece of the plain text cut data has the number of bits different from the other pieces of the plain text cut data.

The two data processing apparatuses just described can be as follows by having two solution generating means.

To be more specific, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; first solution generating means for sequentially generating new solutions each time the subject data is encrypted by assigning past solutions to a predetermined solution generating algorithm capable of generating a new solution by assigning at least one of the past solutions thereto; first algorithm generating means for sequentially generating new algorithms each time the subject data is encrypted by using the solutions generated by the first solution generating means; second solution generating means for sequentially generating the same new solutions as those generated by the first solution generating means each time the encrypted data is decrypted by assigning past solutions to a predetermined solution generating algorithm capable of generating a new solution by assigning at least one of the past solutions thereto; second algorithm generating means for sequentially generating the same new algorithms as those generated by the first algorithm generating means each time the encrypted data is decrypted by using the solutions generated by the second solution generating means; encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data by the number of bits shorter than the standard number of bits so that at least a piece of the subject data has the number of bits different from the other pieces of the subject data; and having mixing means provided for the sake of matching the number of bits of the plain text cut data with the standard number of bits by including dummy data irrelevant to the subject data in the plain text cut data.

Or else, it is a data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising: cutting means for cutting the subject data by a predetermined number of bits into multiple pieces of plain text cut data and also cutting the encrypted data into multiple pieces of encrypted cut data by the same number of bits by which the encrypted data is cut when encrypted; first solution generating means for sequentially generating new solutions each time the subject data is encrypted by assigning past solutions to a predetermined solution generating algorithm capable of generating a new solution by assigning at least one of the past solutions thereto; first key generating means for sequentially generating new keys each time the subject data is encrypted by using the solutions generated by the first solution generating means; second solution generating means for sequentially generating the same new solutions as those generated by the first solution generating means each time the encrypted data is decrypted by assigning past solutions to a predetermined solution generating algorithm capable of generating a new solution by assigning at least one of the past solutions thereto; second key generating means for sequentially generating the same new keys as those generated by the first key generating means each time the encrypted data is decrypted by using the solutions generated by the second solution generating means; encrypting and decrypting means for encrypting the plain text cut data with the algorithm and the key generated by the first key generating means to render it as the encrypted cut data and decrypting the encrypted cut data with the algorithm used when encrypting the encrypted cut data and the same key as that used when encrypting the encrypted data generated by the second key generating means to render it as the plain text cut data, the means performing the encryption or the decryption per standard number of bits as a standard; reading and writing means for recording on the recording medium the encrypted data having the encrypted cut data encrypted by the encrypting and decrypting means connected as one and reading the encrypted data recorded on the recording medium from the recording medium; connecting means for connecting the decrypted plain text cut data to render it as the subject data; and wherein: the cutting means cuts the subject data by the number of bits shorter than the standard number of bits so that at least a piece of the subject data has the number of bits different from the other pieces of the subject data; and having mixing means provided for the sake of matching the number of bits of the plain text cut data with the standard number of bits by including dummy data irrelevant to the subject data in the plain text cut data.

It is also possible, by the method exemplified below, to obtain the effects of the two data processing apparatuses just described.

It is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a first solution generating step of sequentially generating new solutions each time the subject data is encrypted by assigning past solutions to a predetermined solution generating algorithm capable of generating a new solution by assigning at least one of the past solutions thereto; a step of matching the number of bits of the plain text cut data with the standard number of bits as a standard by including dummy data irrelevant to the subject data in the plain text cut data; a first algorithm generating step of sequentially generating new algorithms each time the subject data is encrypted by using the solutions generated in the first solution generating step; a step of encrypting the plain text cut data with the key and the algorithm generated in the first algorithm generating step per standard number of bits to render it as the encrypted cut data; a step of recording the encrypted data having the encrypted cut data connected as one on the recording medium; a step of reading the encrypted data recorded on the recording medium from the recording medium; a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto; a second algorithm generating step of sequentially generating the same new algorithms as those generated in the first algorithm generating step each time the encrypted data is decrypted by using the solutions generated in the second solution generating step; a step of cutting the encrypted data into multiple pieces of encrypted cut data by the same number of bits by which the encrypted data is cut when encrypted; a step of decrypting the encrypted cut data with the key used when encrypting the encrypted cut data and the same algorithm as that used when encrypting the encrypted data generated in the second algorithm generating step per standard number of bits to render it as the plain text cut data; a step of connecting the decrypted plain text cut data to render it as the subject data; and wherein: the data processing apparatus encrypts multiple pieces of the subject data to render them as the encrypted data, decrypts multiple pieces of the encrypted data in the same order as the order used on encryption thereof and cuts the subject data to have the number of bits shorter than the standard number of bits so that at least a piece of the plain text cut data has the number of bits different from the other pieces of the plain text cut data.

Or else, it is a data processing method executed on a data processing apparatus executing steps of: encrypting subject data in plain text by using a predetermined algorithm and a predetermined key to render it as encrypted data; recording the encrypted data on a predetermined recording medium; and decrypting the encrypted data read from the recording medium by using the algorithm and key used when encrypting the encrypted data to render it as the subject data, the data processing apparatus including: a step of cutting the subject data by a predetermined number of bits into multiple pieces of plain text cut data; a first solution generating step of sequentially generating new solutions each time the subject data is encrypted by assigning past solutions to a predetermined solution generating algorithm capable of generating a new solution by assigning at least one of the past solutions thereto; a first key generating step of sequentially generating new keys each time the subject data is encrypted by using the solutions generated in the first solution generating step; a step of matching the number of bits of the plain text cut data with the standard number of bits as a standard by including dummy data irrelevant to the subject data in the plain text cut data; a step of encrypting the plain text cut data with the algorithm and the key generated in the first key generating step per standard number of bits to render it as the encrypted cut data; a step of recording the encrypted data having the encrypted cut data connected as one on the recording medium; a step of reading the encrypted data recorded on the recording medium from the recording medium; a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto; a second key generating step of sequentially generating the same new keys as those generated in the first key generating step each time the encrypted data is decrypted by using the solutions generated in the second solution generating step; a step of cutting the encrypted data into multiple pieces of encrypted cut data by the same number of bits by which the encrypted data is cut when encrypted; a step of decrypting the encrypted cut data with the algorithm used when encrypting the encrypted cut data and the same key as that used when encrypting the encrypted data generated in the second key generating step per standard number of bits to render it as the plain text cut data; a step of connecting the decrypted plain text cut data to render it as the subject data; and wherein: the apparatus encrypts multiple pieces of the subject data to render them as the encrypted data, decrypts multiple pieces of the encrypted data in the same order as the order used on encryption thereof and cuts the subject data to have the number of bits shorter than the standard number of bits so that at least a piece of the plain text cut data has the number of bits different from the other pieces of the plain text cut data.

The third invention and fourth invention can have various variations described as to the first invention and second invention respectively.

The fifth invention is as follows.

The fifth invention is a data processing system, configured by including: multiple first data processing apparatuses; and second data processing apparatuses and third data processing apparatuses of the same number as the first data processing apparatuses pairing off with the multiple first data processing apparatuses respectively, and having communication by means of encrypted data having subject data in plain text encrypted performed between the first data processing apparatus and the second data processing apparatus, and communication by means of the subject data performed between the second data processing apparatus and the third data processing apparatus.

The data processing system has a first apparatus having the first data processing apparatuses and a second apparatus having the second data processing apparatuses and the third data processing apparatuses.

Both the first data processing apparatus and the second data processing apparatus of the data processing system include: cutting means for cutting the subject data by a predetermined number of bits into multiple pieces of plain text cut data and also cutting the encrypted data into multiple pieces of encrypted cut data by the same number of bits by which the encrypted data is cut when encrypted; solution generating means for sequentially generating solutions rendered common between the paired first data processing apparatus and second processing apparatus and different from those of the other first data processing apparatuses and second data processing apparatuses; encrypting and decrypting means for encrypting the plain text cut data with an algorithm generated based on the solutions received from the solution generating means and rendered common between the first data processing apparatus and the second processing apparatus to render it as the encrypted cut data and decrypting the encrypted cut data with the algorithm used when encrypting the encrypted cut data to render it as the plain text cut data; connecting means for connecting the decrypted plain text cut data to render it as the subject data; and transmitting and receiving means for transmitting and receiving the encrypted data.

The third data processing apparatus of the data processing system is the data processing apparatus according to any one of the data processing apparatuses described in the first to fourth inventions, which encrypts the subject data generated on the second data processing apparatus by decrypting the encrypted data encrypted on the first data processing apparatus, records the encrypted data on the recording medium and decrypts the encrypted data read from the recording medium to transmit it to the second data processing apparatus.

The data processing system is an application of the data processing apparatuses described so far. Between the first apparatus having the first data processing apparatuses and the second apparatus having the second data processing apparatuses and third data processing apparatuses, the first data processing apparatuses and the second data processing apparatuses exchange the data by radio or by cable. Therefore, the second data processing apparatuses can record the subject data received from many first data processing apparatuses in an encrypted state on the recording medium thereof. It is an advantage of the data processing system to be able to perform such a one-to-many process.

DETAILED DESCRIPTION OF THE PREFERRED EMBODIMENTS

Figure 1:
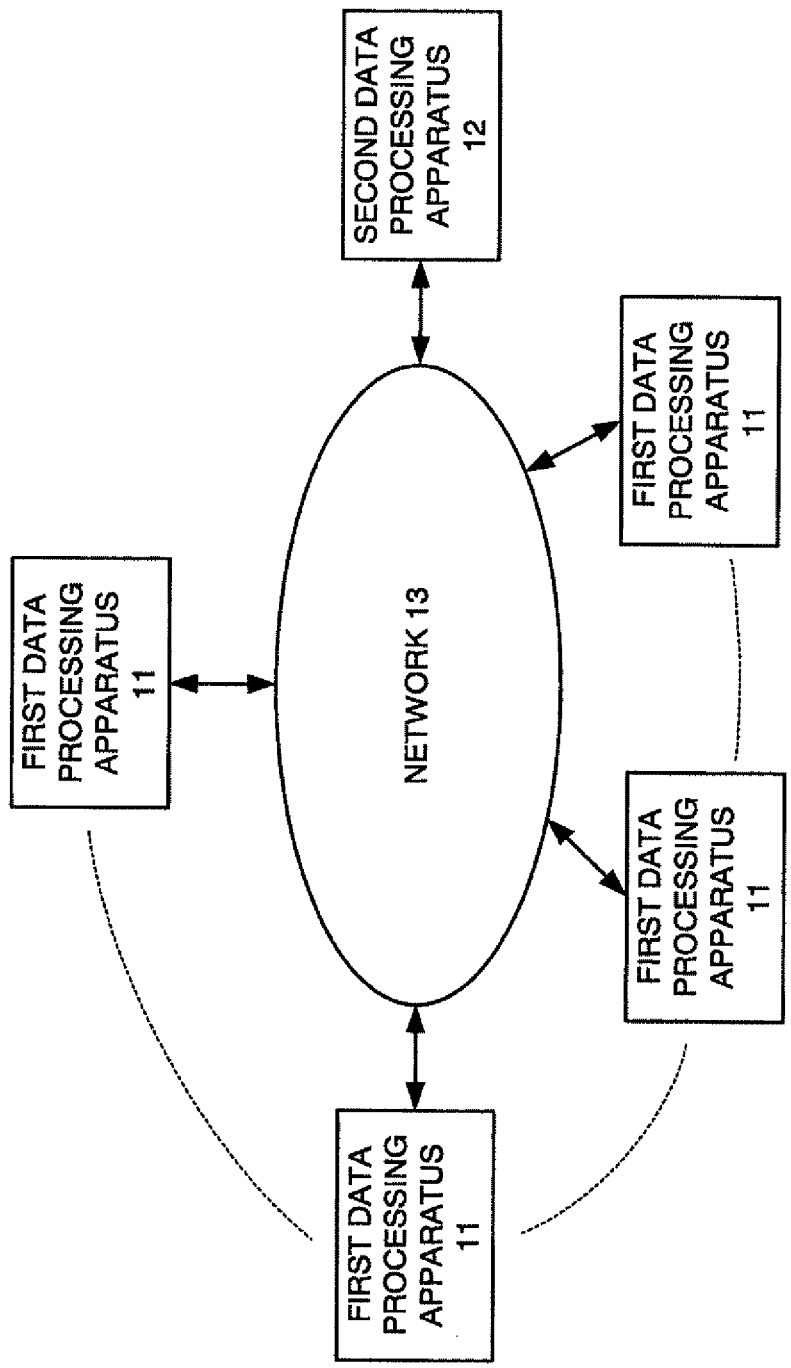
FIG. 1 is a diagram showing an overall configuration of a data processing system according to a first embodiment.

Hereunder, a first preferred embodiment and a second preferred embodiment of the present invention will be described in detail by referring to the drawings. The descriptions of the first embodiment and second embodiment will use common symbols as to common portions and omit overlapping descriptions.

<<First Embodiment>>

A data processing system of this embodiment will be configured in outline as shown in FIG. 1.

The data processing system includes multiple first data processing apparatuses 11 and one second data processing apparatus 12 mutually connected via a network 13. The network 13 is an LAN (Local Area Network) according to this embodiment.

The multiple first data processing apparatuses 11 and the second data processing apparatus 12 mutually perform encrypted communication.

The network 13 may have another configuration if capable of data exchange between the first data processing apparatuses 11 and the second data processing apparatus 12.

The configurations of the first data processing apparatus 11 and the second data processing apparatus 12 will be described. First, the configuration of the first data processing apparatus 11 will be described.

Figure 2:
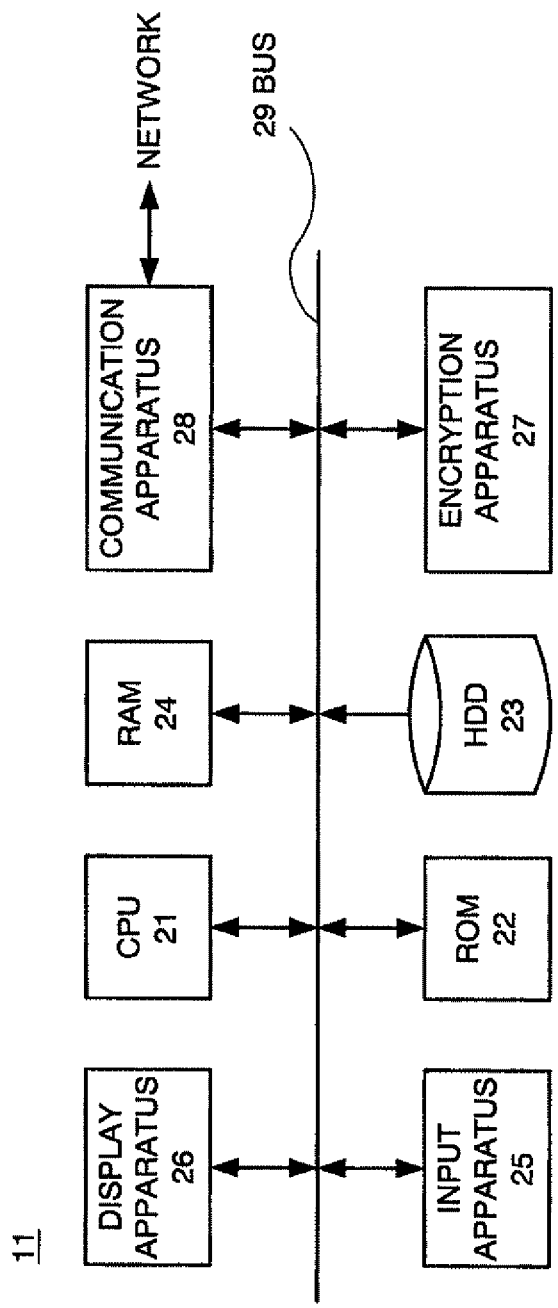
FIG. 2 is a diagram showing a hardware configuration of a first data processing apparatus included in the data processing system shown in FIG. 1.

FIG. 2 shows a hardware configuration of the first data processing apparatus 11.

The first data processing apparatus 11 has configurations including a CPU (central processing unit) 21, an ROM (read only memory) 22, an HDD (hard disk drive) 23, an RAM (random access memory) 24, an input apparatus 25, a display apparatus 26, an encryption apparatus 27, a communication apparatus 28 and a bus 29. The CPU 21, ROM 22, HDD 23, RAM 24, input apparatus 25, display apparatus 26, encryption apparatus 27 and communication apparatus 28 can exchange data via the bus 29.

The ROM 22 or the HDD 23 has a predetermined program and predetermined data (the predetermined data may include subject data as in the case of this embodiment, and includes the data necessary to execute the program) recorded therein. The CPU 21 controls the entire first data processing apparatuses 11, and performs the process described later based on the program and data stored in the ROM 22 or the HDD 23. The RAM 24 is used as a storage area for work for performing the process on the CPU 21.

The input apparatus 25 is configured by a keyboard, a mouse and so on, and is used to input a command and data. The display apparatus 26 is configured by an LCD (liquid crystal display), a CRT (cathode ray tube) and so on, and is used to display the command, inputted data, a processing status described later and so on.

The encryption apparatus 27 encrypts the subject data and decrypts encrypted data as will be described later.

The communication apparatus 28 performs communication with the second data processing apparatuses 12 via the network 13. The communication apparatus 28 of the second data processing apparatuses 12 performs communication with the first data processing apparatuses 11 via the network 13.

Figure 3:
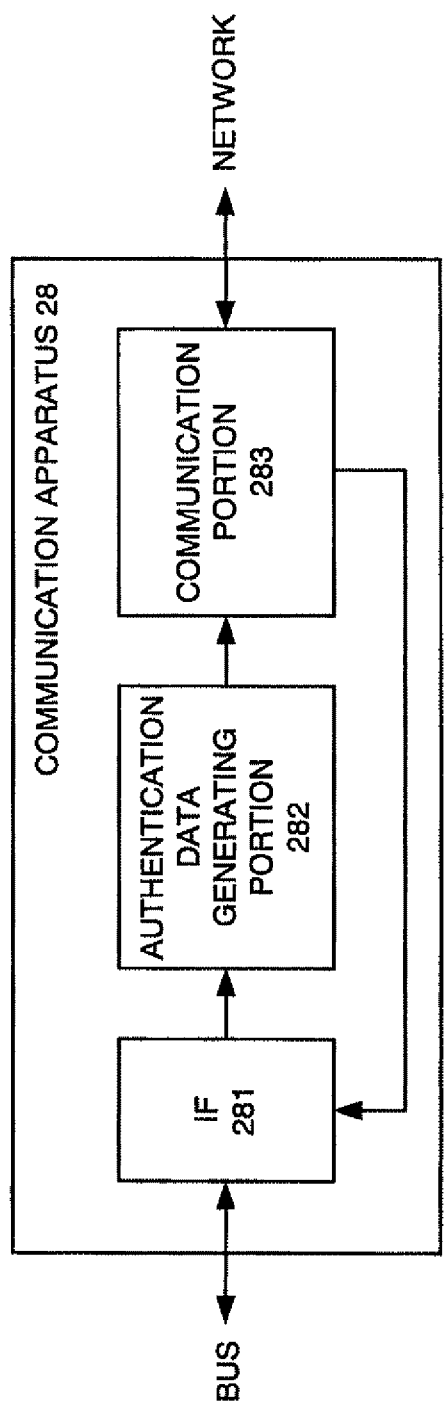
FIG. 3 is a block diagram showing a configuration of a communication apparatus included in the first data processing apparatus shown in FIG. 2.

Next, the configuration of the communication apparatus 28 will be described. FIG. 3 shows a block diagram of the communication apparatus 28.

The communication apparatus 28 is configured by an interface portion 281, an authentication data generating portion 282 and a communication portion 283.

The interface portion 281 exchanges the data between the bus 29 and the communication apparatus 28. The interface portion 281 transmits the encrypted data received from the bus 29 to the authentication data generating portion 282, and also transmits the encrypted data received from the communication portion 283 to the bus 29.

The authentication data generating portion 282 adds authentication data to a header of the transmitted encrypted data, for instance, in the case the encrypted data is transmitted to the second data processing apparatuses 12 as will be described later. The authentication data identifies the first data processing apparatus 11 sending the encrypted data. The authentication data is assigned to each of the first data processing apparatuses 11 by an administrator of the second data processing apparatus 12, and is recorded on the ROM 22 or the HDD 23 for instance. The authentication data generating portion 282 adds the authentication data read from the ROM 22 or the HDD 23 to the encrypted data. The second data processing apparatus 12 can grasp which first data processing apparatus 11 the received encrypted data is transmitted from by the authentication data added to the encrypted data as will be described later. The authentication data generating portion 282 transmits the encrypted data having the authentication data added thereto to the communication portion 283. The communication portion 283 transmits the received encrypted data to the second data processing apparatus 12.

Figure 4:
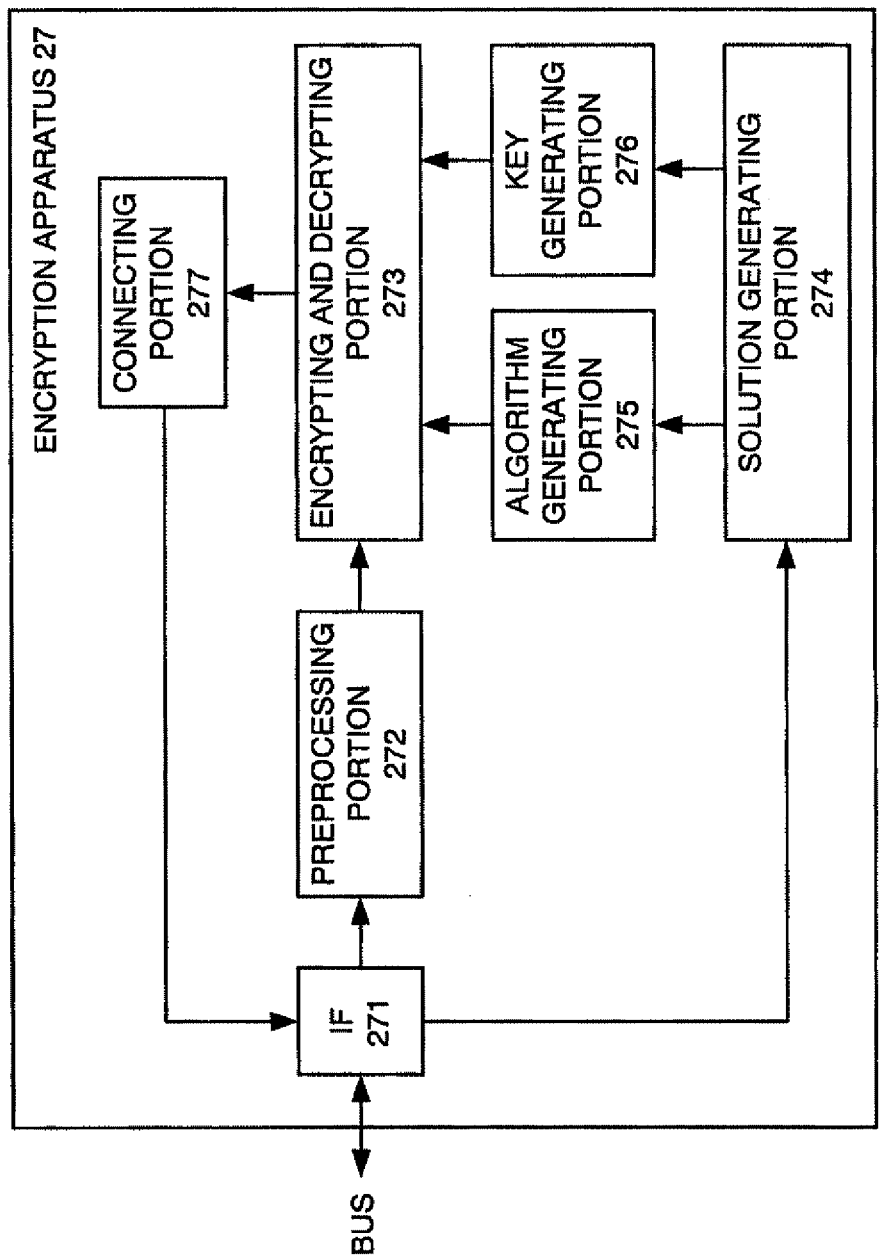
FIG. 4 is a block diagram showing the configuration of an encryption apparatus included in the first data processing apparatus shown in FIG. 2.

Next, the configuration of the encryption apparatus 27 will be described. FIG. 4 shows a block diagram of the encryption apparatus 27.

The encryption apparatus 27 is configured by an interface portion 271, a preprocessing portion 272, an encrypting and decrypting portion 273, a solution generating portion 274, an algorithm generating portion 275, a key generating portion 276 and a connecting portion 277.

The interface portion 271 exchanges data between the bus 29 and the communication apparatus 28.

The interface portion 271 receives the subject data from the HDD 23 via the bus 29 and the encrypted data from the communication apparatus 28 via the bus 29 so as to transmit the received subject data or encrypted data to the preprocessing portion 272. When the interface portion 271 receives the subject data or the encrypted data, it transmits the data indicating reception thereof to the solution generating portion 274.

The interface portion 271 receives the subject data or the encrypted data from the connecting portion 277, and transmits the received subject data or encrypted data to the bus 29 as will be described later.

The preprocessing portion 272 has a function of cutting the subject data or encrypted data received from the bus 29 via the interface portion 271 by a predetermined number of bits to generate plain text cut data or encrypted cut data and transmitting it to the encrypting and decrypting portion 273. It will be described later as to how the subject data or the encrypted data is cut. According to this embodiment, the preprocessing portion 272 has a function of including dummy data irrelevant to the subject data in the subject data by a method described later.

The encrypting and decrypting portion 273 has a function of receiving the plain text cut data or encrypted cut data from the preprocessing portion 272, encrypting the plain text cut data if received and decrypting the encrypted cut data if received. The encrypting and decrypting portion 273 of this embodiment has a fixed standard number of bits as a processing unit for performing the processing of the encryption and decryption. The standard number of bits of this embodiment is 8 bits although it is not limited thereto. Details of the encryption and decryption processing will be described later.

The solution generating portion 274 sequentially generates solutions. The solution generating portion 274 of the first data processing apparatus 11 and the solution generating portion 274A of the second data processing apparatuses 12 described later generate the solutions so that the solutions generated in the same order become the same. The solutions of this embodiment are pseudo-random numbers. The generated solutions are transmitted to the preprocessing portion 272, algorithm generating portion 275 and key generating portion 276.

The algorithm generating portion 275 generates the algorithms based on the solutions received from the solution generating portion 274. The algorithms are used when performing the encryption process and decryption process in the encrypting and decrypting portion 273.

The key generating portion 276 generates the keys based on the solutions received from the solution generating portion 274. The keys are used when performing the encryption process and decryption process in the encrypting and decrypting portion 273.

The connecting portion 277 has a function of connecting the plain text cut data generated by decrypting the encrypted cut data in the encrypting and decrypting portion 273 in original order to render it as a set of the subject data. The subject data is transmitted to the interface portion 271, and is transmitted as necessary to the HDD 23 or the CPU 21 via the bus 29. The connecting portion 277 also has a function of connecting the encrypted cut data generated by encrypting the plain text cut data in the encrypting and decrypting portion 273 to render it as a set of the encrypted data. The encrypted data is transmitted to the interface portion 271, and is transmitted from there to the communication portion 283 of the communication apparatus 28 via the bus 29, and is further transmitted from the communication portion 283 to the second data processing apparatuses 12. The connecting portion 277 does not need to have a function of connecting the encrypted cut data generated by encrypting the plain text cut data in the encrypting and decrypting portion 273. In this case, the encrypted cut data is sequentially transmitted to the communication apparatus at the other end in order in which it is encrypted. In the case where the connecting portion 277 is as described above, the encrypted cut data can be directly transmitted to the communication portion 283 without going through the connecting portion 277.

Next, the configuration of the second data processing apparatus 12 will be described.

Figure 5:
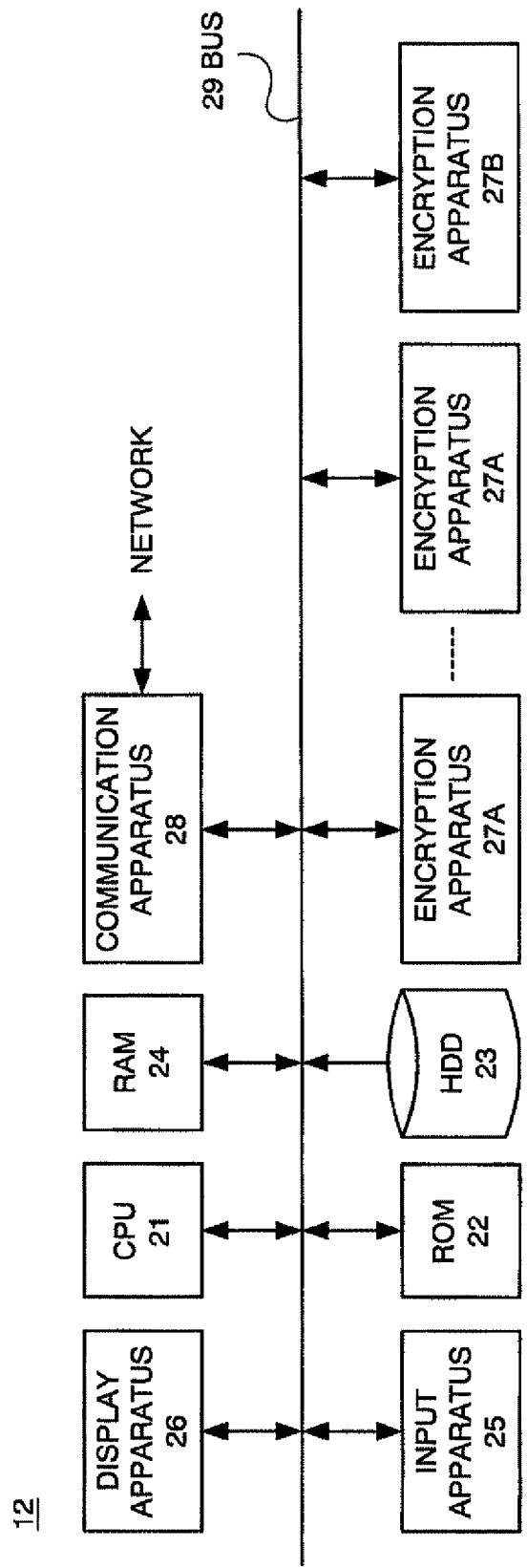
FIG. 5 is a diagram showing the hardware configuration of a second data processing apparatus included in the data processing system shown in FIG. 1.

FIG. 5 shows the hardware configuration of the second data processing apparatus 12.

The hardware configuration of the second data processing apparatus 12 is basically the same as that of the first data processing apparatus 11. It is different from the first data processing apparatuses 11, however, in that it has two kinds of the encryption apparatus 27 while the first data processing apparatus 11 has only one and there are an encryption apparatus 27A and an encryption apparatus 27B provided instead of the encryption apparatus 27.

The CPU 21, ROM 22, HDD 23, RAM 24, input apparatus 25, display apparatus 26, and bus 29 of the second data processing apparatus 12 are the same as those of the first data processing apparatus 11.

The encryption apparatus 27A and encryption apparatus 27B have the functions of encrypting the subject data and decrypting the encrypted data as with the encryption apparatus 27 of the first data processing apparatus 11. Hereunder, the configurations of both of them will be described.

There are multiple encryption apparatuses 27A, that is, as many as the first data processing apparatuses 11. Each of the encryption apparatuses 27A is associated with one of the first data processing apparatuses 11. To be more specific, each of the encryption apparatus 27A and the first data processing apparatus 11 mutually associated can decrypt the encrypted data generated by the other by encrypting the subject data. Inversely, each of the encryption apparatus 27A and the first data processing apparatus 11 not mutually associated cannot decrypt the encrypted data generated by the other by encrypting the subject data.

Figure 6:
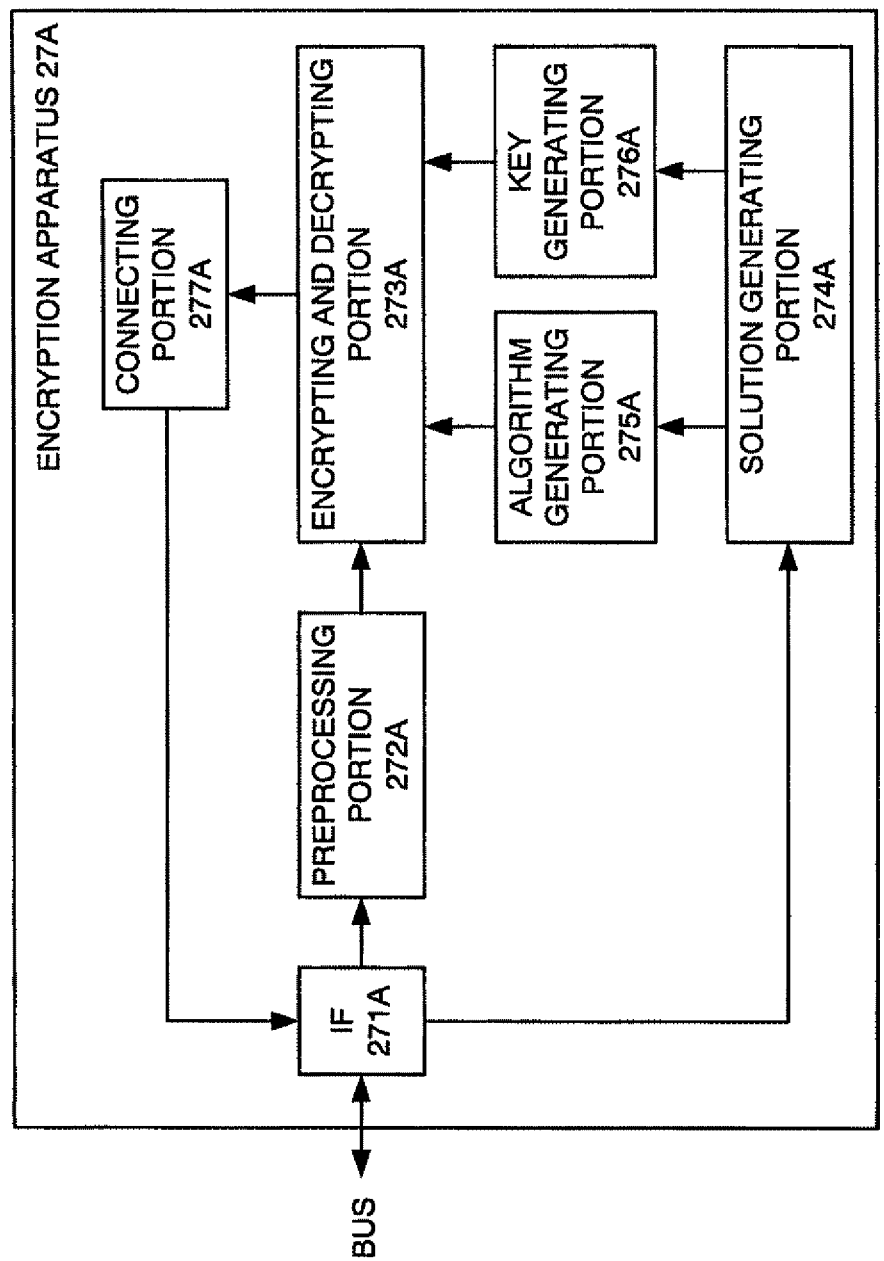
FIG. 6 is a block diagram showing the configuration of the encryption apparatus included in the second data processing apparatus shown in FIG. 5.

The encryption apparatus 27A is configured as shown in FIG. 6.

The encryption apparatus 27A is configured by an interface portion 271A, a preprocessing portion 272A, an encrypting and decrypting portion 273A, a solution generating portion 274A, an algorithm generating portion 275A, a key generating portion 276A and a connecting portion 277A.

The interface portion 271A receives the subject data from the encryption apparatus 27B via the bus 29 and the encrypted data from the communication apparatus 28 via the bus 29 so as to transmit the received subject data or encrypted data to the preprocessing portion 272A. When the interface portion 271A receives the subject data or the encrypted data, it transmits the data indicating reception thereof to the solution generating portion 274A.

The interface portion 271A receives the subject data or the encrypted data from the connecting portion 277A, and transmits the received subject data or encrypted data to the bus 29 as will be described later.

The preprocessing portion 272A has a function of cutting the subject data or encrypted data received from the bus 29 via the interface portion 271A by a predetermined number of bits to generate the plain text cut data or the encrypted cut data and transmitting it to the encrypting and decrypting portion 273A. According to this embodiment, the preprocessing portion 272A has a function of including the dummy data irrelevant to the subject data in the subject data by a method described later.

The encrypting and decrypting portion 273A has a function of receiving the plain text cut data or encrypted cut data from the preprocessing portion 272A, encrypting the plain text cut data if received and decrypting the encrypted cut data if received. The encrypting and decrypting portion 273A of this embodiment has a fixed standard number of bits as the processing unit for performing the processing of the encryption and decryption. The standard number of bits of this embodiment is 8 bits although it is not limited thereto. Details of the encryption and decryption processing will be described later.

The solution generating portion 274A sequentially generates the solutions. The solutions generated by the solution generating portion 274A become the same as the solutions generated by the solution generating portion 274 of the first data processing apparatus 11 in the same order. The generated solutions are transmitted to the preprocessing portion 272A, algorithm generating portion 275A and key generating portion 276A.

The algorithm generating portion 275A generates the algorithms based on the solutions received from the solution generating portion 274A. The algorithms are used when performing the encryption process and decryption process in the encrypting and decrypting portion 273A. The algorithms generated by the algorithm generating portion 275A of the second data processing apparatus 12 become the same as the algorithms generated by the algorithm generating portion 275 of the first data processing apparatus 11 in the same order.

The key generating portion 276A generates the keys based on the solutions received from the solution generating portion 274A. The keys are used when performing the encryption process and decryption process in the encrypting and decrypting portion 273A. The keys generated by the key generating portion 276A of the second data processing apparatus 12 become the same as the keys generated by the key generating portion 276 of the first data processing apparatus 11 in the same order.

The connecting portion 277A of the second data processing apparatus 12 has the same function as that of the first data processing apparatus 11. The connecting portion 277A connects the plain text cut data generated in the encrypting and decrypting portion 273A by decrypting the encrypted cut data as a set so as to generate the subject data. The subject data is transmitted to the encryption apparatus 27B via the bus 29. The connecting portion 277A connects the encrypted cut data generated in the encrypting and decrypting portion 273A by encrypting the plain text cut data as a set so as to generate the encrypted data. The encrypted data is transmitted to the first data processing apparatus 11 via the communication apparatus 28.

There is only one encryption apparatus 27B.

The encryption apparatus 27B has a function of re-encrypting the subject data which the encryption apparatus 27A generated by decrypting encrypted data which is generated by encrypting the first data processing apparatus 11 the subject data. The encryption apparatus 27B records the generated encrypted data on the HDD 23 in the second data processing apparatus 12. The encryption apparatus 2713 also has a function of decrypting the encrypted data read from the HDD 23.

Figure 7:
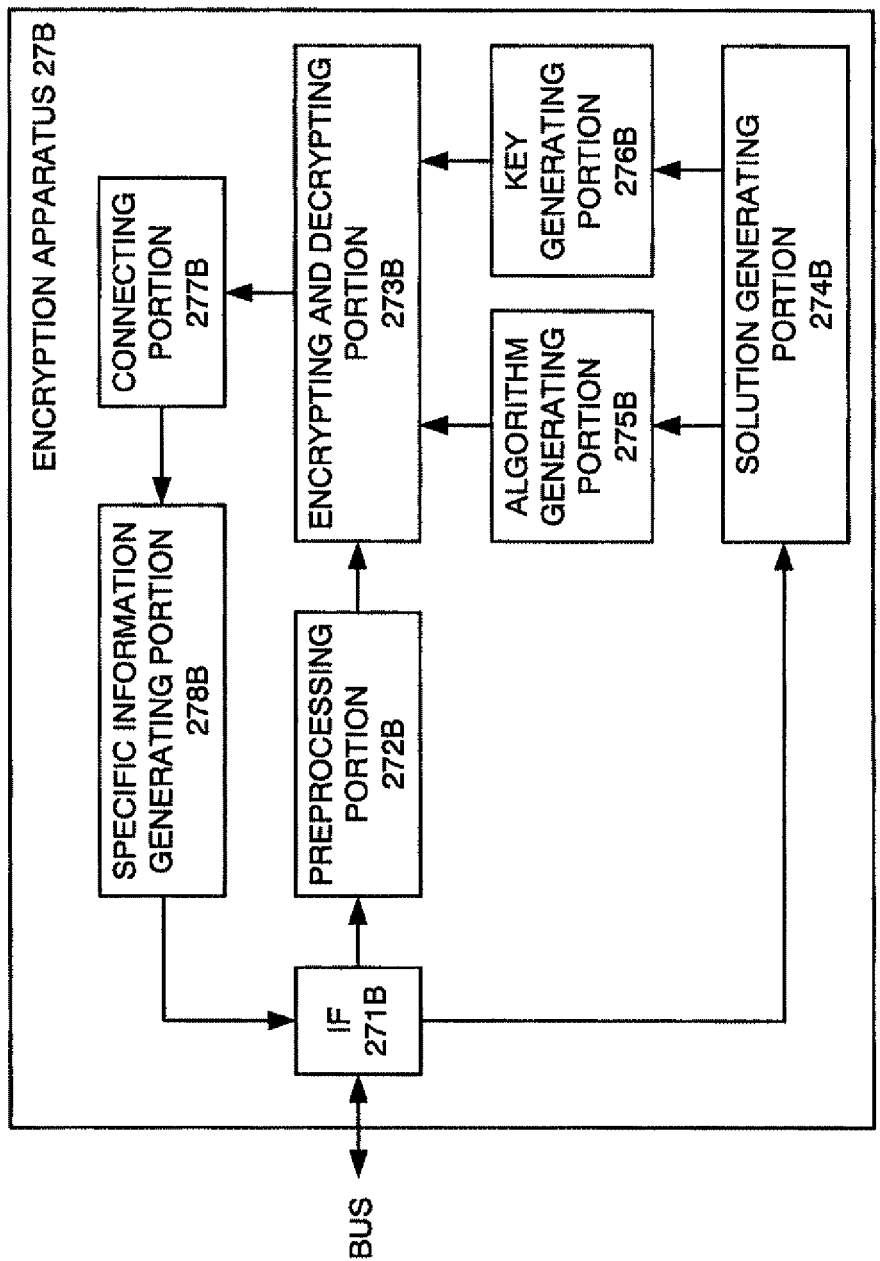
FIG. 7 is a block diagram showing the configuration of another encryption apparatus included in the second data processing apparatus shown in FIG. 5.
Figure 8:
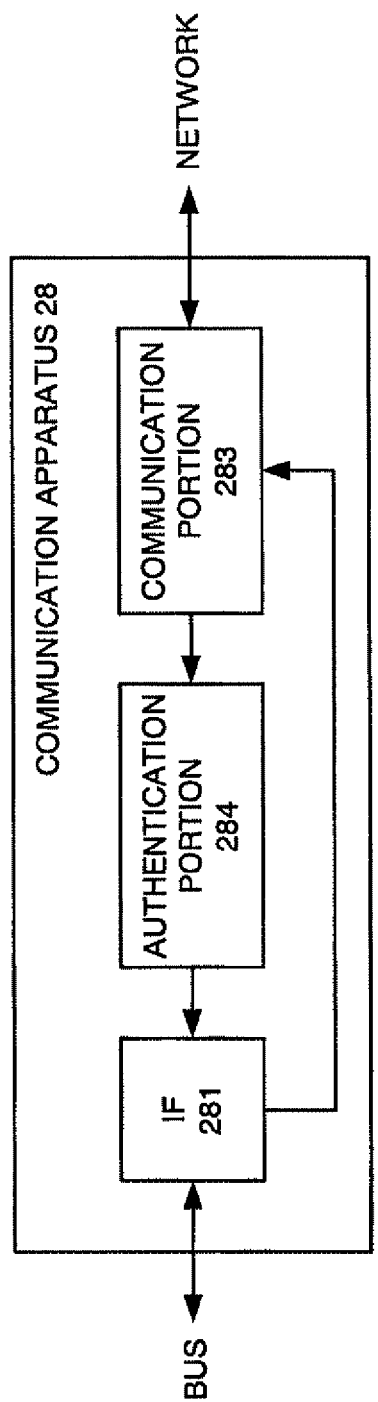
FIG. 8 is a block diagram showing the configuration of the communication apparatus included in the second data processing apparatus shown in FIG. 5.

The encryption apparatus 2713 is configured as shown in FIG. 7.

The encryption apparatus 27B is configured by an interface portion 271B, a preprocessing portion 272B, an encrypting and decrypting portion 27313, a solution generating portion 274B, an algorithm generating portion 275B, a key generating portion 276B, a connecting portion 277B and a specific information generating portion 278B.

The interface portion 271B of the encryption apparatus 27B receives the subject data from the encryption apparatus 27A via the bus 29 and the encrypted data from the HDD 23 in the second data processing apparatus 12 via the bus 29 so as to transmit the received subject data or encrypted data to the preprocessing portion 272B. When the interface portion 271B receives the subject data or the encrypted data, it transmits the data indicating reception thereof to the solution generating portion 274B.

The interface portion 271B receives the subject data from the connecting portion 277B in the encryption apparatus 27B and the encrypted data from the specific information generating portion 278B, and transmits the received subject data or encrypted data to the bus 29 as will be described later.

The preprocessing portion 272B has a function of cutting the subject data or encrypted data received from the bus 29 via the interface portion 271B by a predetermined number of bits to generate the plain text cut data or the encrypted cut data and transmitting it to the encrypting and decrypting portion 273B. According to this embodiment, the preprocessing portion 272B has a function of including the dummy data irrelevant to the subject data in the subject data by a method described later.

The encrypting and decrypting portion 273B has a function of receiving the plain text cut data or encrypted cut data from the preprocessing portion 272B, encrypting the plain text cut data if received and decrypting the encrypted cut data if received. The encrypting and decrypting portion 273B of this embodiment has a fixed standard number of bits as a processing unit for performing the encryption and decryption processing. The standard number of bits of this embodiment is 8 bits although it is not limited thereto. Details of the encryption and decryption processing will be described later. When performing the decryption, the encrypting and decrypting portion 273B performs the decryption by using the algorithms and keys identified based on the specific information described later.

The solution generating portion 274B sequentially generates solutions. The solutions generated by the solution generating portion 274B are the pseudo-random numbers. The generated solutions are transmitted to the algorithm generating portion 275B and key generating portion 276B and to the preprocessing portion 272B in addition according to this embodiment.

The algorithm generating portion 275B generates the algorithms based on the solutions received from the solution generating portion 274B. The algorithms are used when performing the encryption process and decryption process in the encrypting and decrypting portion 273B.

The key generating portion 276B generates the keys based on the solutions received from the solution generating portion 274B. The keys are used when performing the encryption process and decryption process in the encrypting and decrypting portion 273B. The keys generated by the key generating portion 276B of the second data processing apparatus 12 become the same as the keys generated by the key generating portion 276 of the first data processing apparatus 11 in the same order.

The connecting portion 277B of the second data processing apparatus 12 has the function of connecting the plain text cut data generated in the encrypting and decrypting portion 273B by decrypting the encrypted cut data so as to generate the subject data. The subject data is transmitted to the encryption apparatus 27A. The connecting portion 277B connects the encrypted cut data generated in the encrypting and decrypting portion 273B by encrypting the plain text cut data as a set so as to generate the encrypted data. The encrypted data is recorded on the HDD 23 in the second data processing apparatus 12.

The encryption apparatus 27B includes the specific information generating portion 278B.

The specific information generating portion 278B adds the specific information to the encrypted data generated by the connecting portion 277B. The specific information is the information for identifying the algorithm and key used when encrypting the encrypted data to which the specific information is added. To be more precise, it is the information indicating the algorithm itself used when encrypting the encrypted data, the key itself used when encrypting the encrypted data, the solution itself used on generating the algorithm or the key used when encrypting the encrypted data or the information indicating what number generated solution is the solution. According to this embodiment, both the algorithm and the key change, and so the specific information must specify both the algorithm and key or the solution used to generate the algorithm and the key or the order in which the solution was generated. When only one of the algorithm and the key changes, however, the specific information needs to specify only the algorithm or the key that changes.

According to this embodiment, the specific information generating portion 278B adds the specific information to the encrypted data. However, the specific information may also be stored at a different location from the encrypted data while being associated with the encrypted data.

The configuration of the communication apparatus 28 of the second data processing apparatus 12 is approximately the same as the configuration of the communication apparatus 28 of the first data processing apparatus 11. The functions of the interface portion 281 and the communication portion 283 are not different from those of the communication apparatus 28 of the first data processing apparatus 11. The communication apparatus 28 of the second data processing apparatus 12 is different from the communication apparatus 28 of the first data processing apparatus 11 in that it has an authentication portion 284 instead of the authentication data generating portion 282 of the first data processing apparatus 11.

The authentication portion 284 reads authentication data of the encrypted data received from the first data processing apparatus 11 included in the header according to this embodiment, and determines which first data processing apparatus 11 the encrypted data comes from. The encrypted data is transmitted to the encryption apparatus 27A associated with the first data processing apparatus 11 as its transmission source via the interface portion 281.

Next, a description will be given as to a flow of the processing performed in this data processing system.

Figure 9:
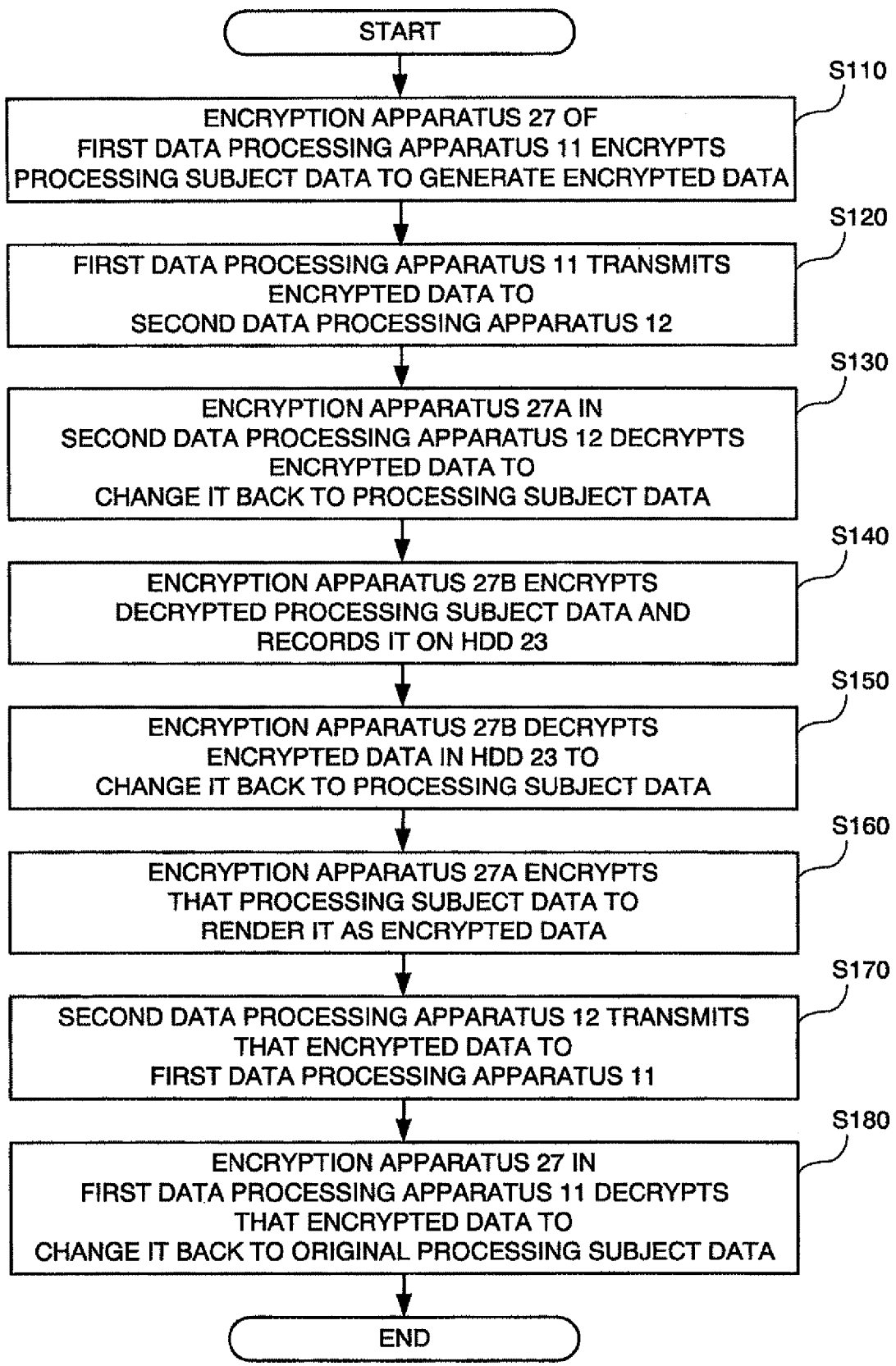
FIG. 9 is a flowchart showing a flow of a process executed in the data processing system shown in FIG. 1.

The flow of the processing performed in this data processing system is as follows if described roughly by using FIG. 9.

First, the encryption apparatus 27 of one first data processing apparatus 11 out of the multiple first data processing apparatuses 11 encrypts the subject data so as to generate the encrypted data (S110).

Next, the first data processing apparatus 11 transmits the encrypted data to the second data processing apparatus 12 (S120).

Next, of the multiple encryption apparatuses 27A in the second data processing apparatus 12 having received the encrypted data, the one associated with the first data processing apparatus 11 having transmitted the encrypted data decrypts the encrypted data and changes it back to the subject data (S130).

Next, the encryption apparatus 273 encrypts the decrypted subject data and records it on the HDD 23 in the second data processing apparatus 12 (S140).

Next, the encryption apparatus 27B decrypts the encrypted data in the HDD 23 and changes it back to the subject data according to a request from the first data processing apparatus 11 for instance (S150).

Next, the encryption apparatus 27A encrypts the subject data and renders it as the encrypted data (S160).

Next, the second data processing apparatus 12 transmits the encrypted data to the first data processing apparatus 11 (S170).

Next, the encryption apparatus 27 in the first data processing apparatus 11 decrypts the encrypted data and changes it back to the original subject data (S180).

Figure 10:
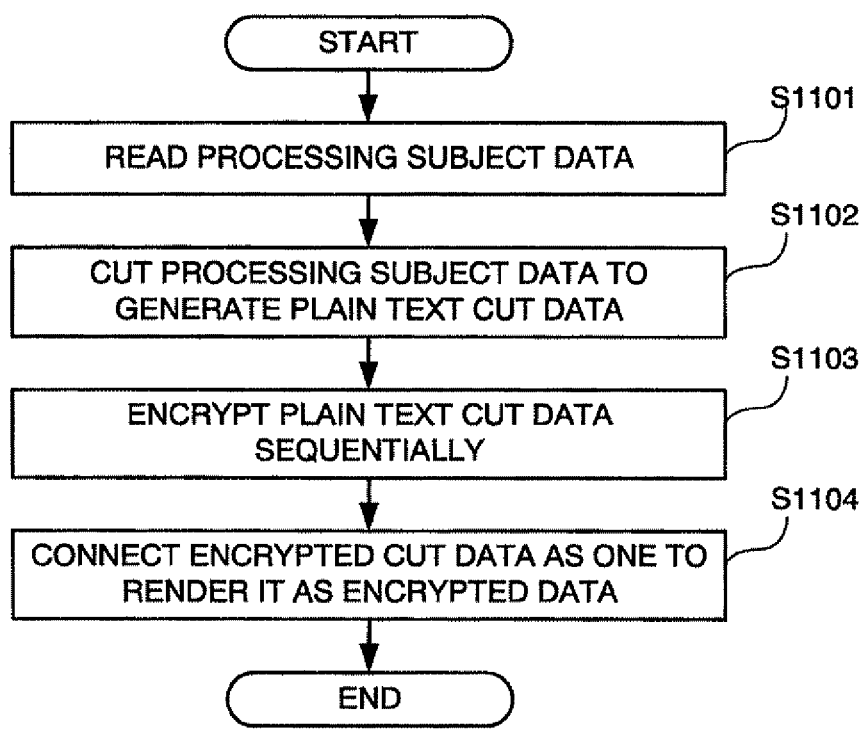
FIG. 10 is a flowchart showing the flow of a process executed in S110 shown in FIG. 9.

First, a detailed description will be given by referring to FIG. 10 as to the above-mentioned step S110 in which the encryption apparatus 27 of one first data processing apparatus 11 out of the multiple first data processing apparatuses 11 encrypts the subject data so as to generate the encrypted data.

First, the subject data is read (S1101). The subject data may be any data whatsoever as long as it is the data necessary to be transmitted from the first data processing apparatus 11 to the second data processing apparatus 12. According to this embodiment, the subject data is stored on the HDD 23. The subject data may also be the data read from another recording medium such as an external recording medium to the first data processing apparatus 11.

For instance, if a command ordering to transmit the subject data from the input apparatus 25 to the second data processing apparatus 12 is input, the CPU 21 reads the subject data from the HDD 23 and stores it temporarily in the RAM 24. The subject data is transmitted from the HDD 23 to the encryption apparatus 27 via the bus 29. To be more precise, the subject data is transmitted to the preprocessing portion 272 via the interface portion 271.

The subject data is cut by a predetermined number of bits into the plain text cut data in the preprocessing portion 272 (S1102). The preprocessing portion 272 includes the dummy data in the plain text cut data as required.

There may be just one method of generating the plain text cut data from the subject data. According to this embodiment, however, the plain text cut data is generated from the subject data by one of the following three methods.

A) The case of cutting the subject data into the plain text cut data by a predetermined number of bits shorter than the standard number of bits, and including the dummy data at respective fixed positions of pieces of the plain text cut data all of which have the number of bits shorter than the standard number of bits.

B) The case of cutting the subject data into the plain text cut data by a predetermined number of bits shorter than the standard number of bits, and including the dummy data at different positions of pieces of the plain text cut data all of which have the number of bits shorter than the standard number of bits.

C) The case of cutting the subject data into the plain text cut data by the number of bits the same as or shorter than the standard number of bits, and including the dummy data in respective pieces of the plain text cut data having the number of bits shorter than the standard number of bits.

It is decided by the solutions generated by the solution generating portion 274 as to which of the above-mentioned three methods should be used to generate the plain text cut data from the subject data.

A description will be given first as to how the solution generating portion 274 generates the solutions.

When the interface portion 271 receives the subject data from the bus 29, the solution generating portion 274 receives that information from the interface portion 271.

The solution generating portion 274 takes this opportunity to start generating the solutions. According to this embodiment, the solution generating portion 274 generates the solutions each time the subject data is received by the interface portion 271. The solution of this embodiment is a matrix (X) with 8 rows and 8 columns although it is not limited thereto.

According to this embodiment, the solution generating portion 274 generates the solutions successively as if in non-linear transition though it does not always have to be the case. The solutions consequently become the pseudo-random numbers.

To generate the solutions successively as if in nonlinear transition, there are thinkable techniques, such as (1) including exponential calculation of the past solutions in the process of generating the solutions, (2) including multiplication of two or more past solutions in the process of generating the solutions, or a combination of (1) and (2).

According to this embodiment, the solution generating portion 274 has a $01^{st}$ solution ($X_{01}$) and a $02^{nd}$ solution ($X_{02}$) predetermined as initial matrixes (for instance, the $01^{st}$ solution and $02^{nd}$ solution are recorded in a predetermined memory such as the HDD 23 or the ROM 22). The initial matrixes each first data processing apparatuses 11 has are different from one another, and so the solutions generated by the first data processing apparatuses 11 are different from one another.

Each of the multiple encryption apparatuses 27A of the second data processing apparatus 12 has the same initial matrix as that of the first data processing apparatus 11 associated with each of the multiple encryption apparatuses 27A.

The solution generating portion 274 assigns the initial matrixes to the solution generating algorithm and generates a $1^{st}$ solution ($X_1$) as follows.

$1^{st}$ solution ($X_1$)=$X_{02}X_{01}+\alpha$ ($\alpha$=matrix with 8 rows and 8 columns)

This is the solution generated first.

Next, when the interface portion 271 receives the subject data from the bus 29, the solution generating portion 274 generates a 2nd solution ($X_2$) as follows.

$2^{nd}$ solution ($X_2$)=$X_1 X_{02}+\alpha$

Similarly, each time the interface portion 271 receives the subject data from the bus 29, the solution generating portion 274 generates $3^{rd}$, $4^{th}$, ... $N^{th}$ solutions as follows.

$3^{rd}$ solution ($X_3$)=$X_2 X_1+\alpha$ $4^{th}$ solution ($X_4$)=$X_3 X_2+\alpha$

:

$N^{th}$ solution ($X_N$)=$X_{N-1}X_{N-2}+\alpha$

The solutions thus generated are transmitted to the preprocessing portion 272, the algorithm generating portion 275, the key generating portion 276 and are also held in the solution generating portion 274. To generate the $N^{th}$ solution ($X_N$), this embodiment uses an $(N-1)^{th}$ solution ($X_{N-1}$) and an $(N-2)^{th}$ solution ($X_{N-2}$), that is, the two solutions generated immediately before then. Therefore, to generate the new solution, the solution generating portion 274 must hold the two nearest preceding solutions generated in the past (or else, the two solutions must be held by some other portion than the solution generating portion 274). Inversely, the solutions older than the two nearest preceding solutions generated in the past are not to be used to generate the new solution from now on. Thus, this embodiment always holds the two past solutions in the solution generating portion 274. However, this embodiment erases the solution which is now the third nearest preceding solution due to the generation of the new solution but was the second nearest preceding solution till then from the predetermined memory or the like in which it was recorded.

The solutions thus generated are chaotic in nonlinear transition, and are also the pseudo-random numbers.

To cause the nonlinear transition, it is thinkable, when acquiring the $N^{th}$ solution, to use the following formulas other than the above-mentioned formula: $N^{th}$ solution $(X_N)= X_{N-1}X_{N-2}+\alpha$.

For instance;
(a) $N^{th}$ solution $(X_N)=(X_{N-1})^P$
(b) $N^{th}$ solution $(X_N)=(X_{N-1})^P(X_{N-2})^Q(X_{N-3})^R(X_{N-4})^S$
(c) $N^{th}$ solution $(X_N)=(X_{N-1})^P+(X_{N-2})^Q$ P, Q, R and S are predetermined constants respectively. The solution generating portion 274 has two initial matrixes in the case of using the formula (a) or (c), and has four initial matrixes in the case of using the formula (b).

The above-mentioned $\alpha$ is a constant. However, it may also be specific changing environmental information. The environmental information is the information naturally generated in sequence as time elapses and commonly obtainable at distant places, such as the information determined based on weather of a specific region, information determined based on the contents of a TV broadcast of a TV station broadcasted at a specific time and information determined based on a result of a specific sport.

It is possible to further improve confidentiality of the communication by creating the above-mentioned $\alpha$ in series and generating common information.

It is also possible, as a matter of course, to add $\alpha$ (may be generated from the environmental information) to right sides of the formulas (a) to (c).

As described above, the preprocessing portion 272 having received the solutions (that is, the above-mentioned solutions) decides which of the above-mentioned methods of A), B) and C) should be used to generate the plain text cut data. According to this embodiment, the plain text cut data is generated by the method A) in the case where, in dividing the sum of adding up the numbers configuring the matrix with 8 rows and 8 columns as the solutions by 3, a remainder thereof is 0, by the method B) in the case where the remainder is 1, and by the method C) in the case where the remainder is 2, though it does not always have to be the case.

In the case of generating the plain text cut data by the method A), the preprocessing portion 272 cuts the subject data received from the interface portion 271 by the predetermined number of bits (7 bits in this embodiment) shorter than the standard number of bits in order from the head to generate the plain text cut data. The preprocessing portion 272 embeds the dummy data at a fixed position of the plain text cut data. The positions of the plain text cut data for embedding the dummy data may be either variable or fixed. In the latter case, the position at which the dummy data is embedded may be the head or the end of the plain text cut data or a predetermined intermediate position such as a second bit or a third bit. The dummy data may be any data as long as it is irrelevant data to the subject data. For instance, there are thinkable processes, such as constantly embedding the data of 0 or the data of 1, or alternately embedding the data of 1 and 0. As a further example, it is possible to decide what dummy data is to be embedded based on the above-mentioned solutions. For instance, if the sum of the numbers configuring the matrix with 8 rows and 8 columns as the solutions added up is divided by 9 and the remainder thereof is 0, it is possible to continue 0, such as 0, 0, 0, 0 . . . . If the remainder is 1, it is possible to put in 1 alternately, such as 0, 1, 0, 1 . . . . If the remainder is 2, it is possible to put in 1 at every third place, such as 0, 0, 1, 0, 0, 1 . . . . Likewise, it is possible to put in 1 at every fourth place if the remainder is 3, put in 1 at every fifth place if the remainder is 4, and put in 1 at every tenth place if the remainder is 9.

In the case of generating the plain text cut data by the method B), the preprocessing portion 272 cuts the subject data by the predetermined number of bits (7 bits for instance) shorter than the standard number of bits to render it as the plain text cut data, and includes the dummy data at different positions of respective pieces of the plain text cut data all of which have the number of bits shorter than the standard number of bits. In this case, the positions at which the dummy data is embedded may be fixed or regularly changing, such as moving in order of the first bit, second bit, third bit . . . eighth bit, first bit, second bit, . . . eighth bit, or randomly changing as to each piece of the plain text cut data. If the positions at which the dummy data is embedded randomly change, the positions may be decided based on the solutions for instance.

As for the method of deciding the positions at which the dummy data is embedded by means of the solutions, it is possible to perform the following process for instance. If the sum of the numbers configuring the matrix with 8 rows and 8 columns as the solutions added up is divided by 8 and the remainder thereof is 0, the dummy data is embedded alternately at the head and the end of the pieces of the plain text cut data. If the remainder is 1, the plain text cut data having the dummy data embedded at the head and the plain text cut data having the dummy data embedded at the end are arranged to be at every third place. If the remainder is 2, the plain text cut data having the dummy data embedded at the head and the plain text cut data having the dummy data embedded at the end are arranged to be at every fourth place. If the remainder is 7, the plain text cut data having the dummy data embedded at the head and the plain text cut data having the dummy data embedded at the end are arranged to be at every ninth place. It is also possible to further move the positions at which the dummy data is embedded rather than fixing the positions such as the head and end.

In the case of generating the plain text cut data by the method C), the subject data is cut to be the standard number of bits or the number of bits shorter than the standard number of bits. This cutting can be performed by cutting the subject data to a random length shorter than 8 bits. For instance, if the sum of the numbers configuring the matrix with 8 rows and 8 columns as the solutions added up is divided by 8 and the remainder thereof is 0, the head of the subject data at that point in time can be cut by 8 bits. If the remainder is 1, the head of the subject data at that point in time can be cut by 1 bit. If the remainder is 2, the head of the subject data at that point in time can be cut by 2 bits. If the remainder is 7, the head of the subject data at that point in time can be cut by 7 bits. Of the plain text cut data thus generated, the preprocessing portion 272 embeds the dummy data in each piece of the plain text cut data of which number of bits is shorter than the standard number of bits. In this case, an embedding position of the dummy data may be a same position such as the head or the end or a predetermined changing position specified by the solutions for instance.

In any case, the plain text cut data thus generated is transmitted to the encrypting and decrypting portion 273 as a stream in order of generation.

In parallel with the generation of the plain text cut data, the algorithm generating portion 275 generates the algorithm used on encrypting the plain text cut data.

According to this embodiment, the algorithm generating portion 275 generates the algorithm based on the solutions.

According to this embodiment, the algorithm generating portion 275 generates the algorithm as follows.

The algorithm of this embodiment is defined as "in the case where the plain text cut data as 8-bit data is considered as a matrix Y with 1 row and 8 columns, it is acquired by multiplying by Y the matrix X with 8 rows and 8 columns as the solutions raised to the a-th power and turned clockwise by $n \times 90°$."

Here, there are the cases where a is a predetermined constant. According to this embodiment, however, a is a number changing based on the solutions. To be more specific, the algorithm of this embodiment changes based on the solutions. For instance, a can be defined as the remainder in the case of dividing by 5 the number acquired by adding up all the numbers as elements of the matrix included in the solutions which are the matrix with 8 rows and 8 columns (provided that it is a=1 in the case where the remainder is 0).

The above-mentioned n is a predetermined number defined by the key, If the key is a constant number, n is fixed. As described below, however, the key changes based on the solutions. To be more specific, this n also changes based on the solutions according to this embodiment.

It is also possible to decide on another algorithm.

According to this embodiment, the algorithm generating portion 275 generates the algorithm each time it receives the solutions from the solution generating portion 274, and transmits it to the encrypting and decrypting portion 273.

In parallel with the generation of the plain text cut data, the key generating portion 276 generates the key used on encrypting the plain text cut data.

The key generating portion 276 generates the key based on the solutions.

According to this embodiment, the key generating portion 276 generates the key as the following.

The key of this embodiment is the number acquired by adding up all the numbers as the elements of the matrix included in the solutions which are the matrix with 8 rows and 8 columns. Therefore, the key changes based on the solutions according to this embodiment.

It is also possible to decide on another key.

According to this embodiment, the key generating portion 276 generates the key each time it receives the solutions from the solution generating portion 274, and transmits it to the encrypting and decrypting portion 273.

The encrypting and decrypting portion 273 encrypts the plain text cut data received from the preprocessing portion 272 based on the algorithm received from the algorithm generating portion 275 and the key received from the key generating portion 276 (S1103).

As described above, the algorithm is defined as "in the case where the plain text cut data as 8-bit data is considered as a matrix Y with 1 row and 8 columns, it is acquired by multiplying by Y the matrix X with 8 rows and 8 columns as the solutions raised to the a-th power and turned clockwise by $n \times 90°$," and n as the key is the above-mentioned number.

If a is 3 and n is 6 for instance, the encryption is performed by multiplying by the plain text cut data the matrix with 8 rows and 8 columns acquired by turning the matrix with 8 rows and 8 columns acquired by cubing X clockwise by $6 \times 90° = 540°$.

The data thus generated is the encrypted cut data.

The encrypted cut data is transmitted to the connecting portion 277. The connecting portion 277 connects the encrypted cut data as one, and generates the encrypted data (S1104). Sorting order of the encrypted cut data in this case is corresponding to the sorting order of the original plain text cut data.

Thus, the step S110 in which the first data processing apparatus 11 encrypts the subject data to generate the encrypted data is finished first.

The encrypted data thus generated is transmitted to the communication apparatus 28 in the first data processing apparatus 11 via the bus 29. The encrypted data is received by the interface portion 281 in the communication apparatus 28 to be transmitted to the authentication data generating portion 282. The authentication data generating portion 282 adds the authentication data to the header of the encrypted data, and transmits the encrypted data to the communication portion 283.

The communication portion 283 transmits the encrypted data to the second data processing apparatus 12 via the network 13. The above-mentioned step S120 is thereby performed.

In the second data processing apparatus 12 having received the encrypted data, the step S130 of decrypting the encrypted data and changing it back to the subject data is performed.

Figure 11:
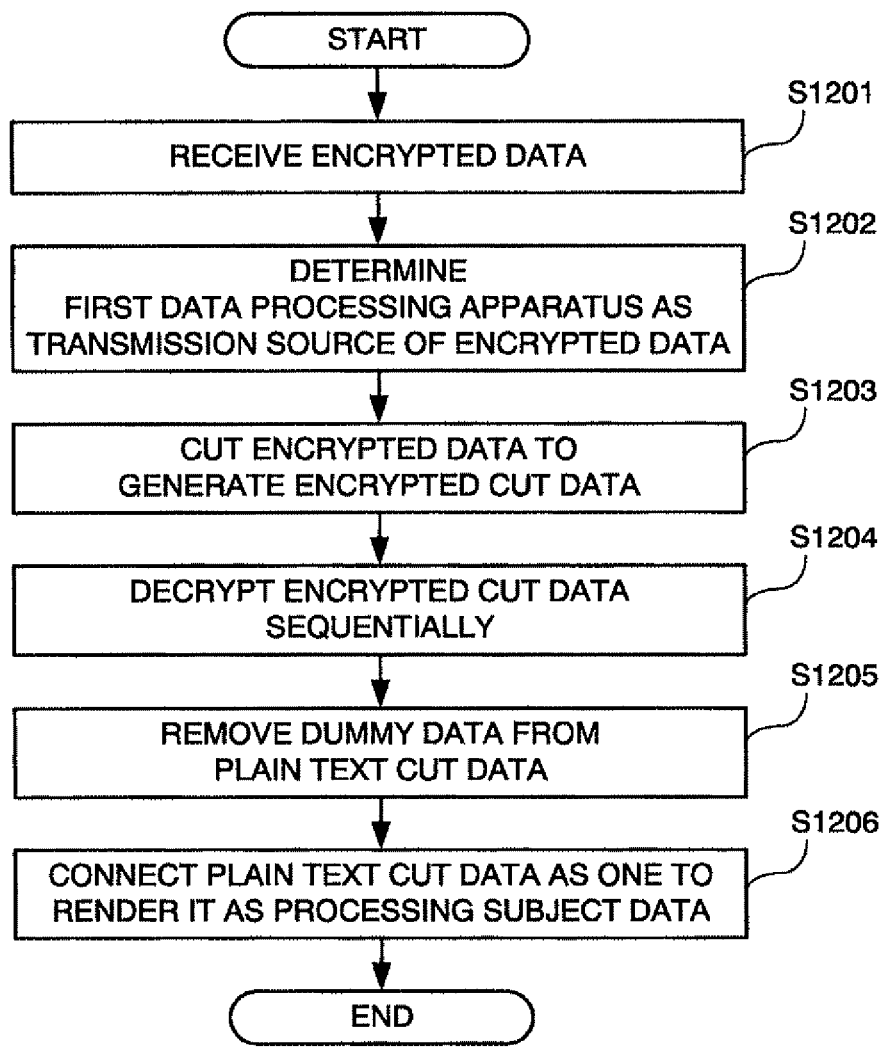
FIG. 11 is a flowchart showing the flow of a process executed in S130 shown in FIG. 9.

Hereunder, this decryption step will be described in detail by referring to FIG. 11.

The encrypted data transmitted to the second data processing apparatus 12 is received by the communication portion 283 of the communication apparatus 28 of the second data processing apparatus 12 (S1201).

The communication portion 283 transmits the encrypted data to the authentication portion 284. The authentication portion 284 determines which first data processing apparatus 11 the encrypted data comes from based on the authentication data added to the encrypted data (S1202).

After such a determination is made by the authentication portion 284, the encrypted data is transmitted to the interface portion 281. The interface portion 281 transmits the encrypted data to the encryption apparatuses 27A associated with the first data processing apparatus 11 determined to be the transmission source of the encrypted data by the authentication portion 284.

The preprocessing portion 272A in the encryption apparatus 27A receives the encrypted data via the interface portion 271A.

The preprocessing portion 272A cuts the received encrypted data by a predetermined number of bits, and generates the encrypted cut data (S1203).

In the case of cutting the encrypted data and generating the encrypted cut data, the preprocessing portion 272A performs a process reverse to the process performed by the connecting portion 277 of the first data processing apparatus 11. To be more specific, the encrypted data is cut by 8 bits from the head to be divided into multiple pieces of the encrypted cut data.

Next, the encrypted cut data is transmitted to the encrypting and decrypting portion 273A, where it is decrypted and rendered as the plain text cut data (S1204).

The decryption is performed as a process reverse to the process performed by the encrypting and decrypting portion 273 of the first data processing apparatus 11. For that reason, the second data processing apparatus 12 requires the algorithm and key required on performing the encryption on the first data processing apparatus 11.

The algorithm and key used for the decryption are generated inside the encryption apparatus 27A. Working thereof will be described.

The information that the interface portion 271A of the encryption apparatus 27A received the encrypted data is transmitted to the solution generating portion 274A. The solution generating portion 274A having received this information takes this opportunity to generate the solutions each time it receives this information.

The generation of the solutions performed by the solution generating portion 274A in the encryption apparatus 27A of the second data processing apparatus 12 is performed through the same step as the step performed by the solution generating portion 274 of the first data processing apparatus 11. As described above, the solution generating portion 274A has the same initial matrix and solution generating algorithm as those of the solution generating portion 274 of the first data processing apparatus 11 associated with the encryption apparatus 27A including the solution generating portion 274A. Therefore, the solutions generated in the encryption apparatus 27A of the second data processing apparatus 12 are the same as the solutions generated in the corresponding encryption apparatus 27A of the first data processing apparatus 11 if the data in the same order of generation is compared.

The generated solutions are transmitted from the solution generating portion 274A to the preprocessing portion 272A, algorithm generating portion 275A and key generating portion 276A.

The algorithm generating portion 275A generates the algorithm based on the received solution each time it receives the solutions. The step in which the algorithm generating portion 275A of the second data processing apparatus 12 generates the algorithm is the same as the step in which the algorithm generating portion 275 of the first data processing apparatus 11 generates the algorithm. The generated algorithm is transmitted from the algorithm generating portion 275A to the encrypting and decrypting portion 273A.

The key generating portion 276A generates the key based on the received solutions each time it receives the solutions. The step in which the key generating portion 276A of the second data processing apparatus 12 generates the key is the same as the step in which the key generating portion 276 of the first data processing apparatus 11 generates the key. The generated key is transmitted from the key generating portion 276A to the encrypting and decrypting portion 273A.

As for this data processing system, new solutions are generated on the first data processing apparatus 11 each time the encryption is performed on the first data processing apparatus 11, and new solutions are also generated on the second data processing apparatus 12 each time the solutions generated on the first data processing apparatus 11 are decrypted on the second data processing apparatus 12. As described above, the solutions generated by the encryption apparatus 27A of the second data processing apparatus 12 are the same as the solutions generated by the corresponding encryption apparatus 27 in the first data processing apparatus 11 if the data in the same order of generation is compared. Therefore, all the solutions generated when encrypting certain subject data on the first data processing apparatus 11 and the algorithms and keys generated based on those solutions constantly match with the solutions generated by the encryption apparatus 27A of the second data processing apparatus 12 and the algorithms and keys generated based on those solutions when decrypting the encrypted data generated on the first data processing apparatus 11 by using the algorithms and keys generated based on the solutions. These circumstances are the same even when the encryption is performed on the second data processing apparatus 12 and the decryption is performed on the first data processing apparatus 11.

As described above, the encrypting and decrypting portion 273A performs the decryption process by using the algorithm received from the algorithm generating portion 275A. To be more precise, the encrypting and decrypting portion 273A performs the decryption process by generating the algorithm for performing the decryption process (defined as "in the case where the encrypted cut data is considered as a matrix Z with 1 row and 8 columns, the plain text cut data is acquired by multiplying by Y an inverse matrix of the matrix X with 8 rows and 8 columns as the solution raised to the a-th power and turned clockwise by n×90°") based on the algorithm received from the algorithm generating portion 275A (defined as "in the case where the plain text cut data as 8-bit data is considered as a matrix Y with 1 row and 8 columns, the encrypted cut data is acquired by multiplying by Y the matrix X with 8 rows and 8 columns as the solution raised to the a-th power and turned clockwise by n×90°") and performing calculation according to the above-mentioned definition by using the key. Thus, the encrypting and decrypting portion 273A decrypts the encrypted cut data provided as a stream from the preprocessing portion 272A one after another so as to generate the plain text cut data.

Next, the encrypting and decrypting portion 273A removes the dummy data from the plain text cut data as required (S1205). As described above, the solutions generated by the solution generating portion 274A are transmitted to the preprocessing portion 272A. These solutions were used when determining how the dummy data was embedded in the plain text cut data in the preprocessing portion 272 of the first data processing apparatus 11. To be more specific, the solutions held by the preprocessing portion 272A of the encryption apparatus 27A at that point in time indicate how the dummy data was embedded in the encrypted cut data (to be more precise, the plain text cut data before the encrypted cut data was encrypted) of which decryption is finished (or being performed or just to be performed) by the encrypting and decrypting portion 273A of the second data processing apparatus 12.

The preprocessing portion 272A transmits to the encrypting and decrypting portion 273A the information on where in the plain text cut data decrypted by the encrypting and decrypting portion 273A the dummy data is embedded.

The encrypting and decrypting portion 273A removes the dummy data from the plain text cut data by using the information.

The plain text cut data thus generated is transmitted to the connecting portion 277A. The connecting portion 277A connects the received plain text cut data as one and changes it back to the subject data in the original state before being encrypted on the first data processing apparatus 11 (S1206).

Thus, the step S130 in which the second data processing apparatus 12 decrypts the encrypted data and changes it back to the subject data is finished.

The generated subject data is transmitted from the connecting portion 277A to the interface portion 271A, and is then transmitted to the encryption apparatus 27B via the bus 29.

Here, the encryption apparatus 27B performs the process of the above-mentioned step S140 of re-encrypting the decrypted subject data to render it as the encrypted data.

Figure 12:
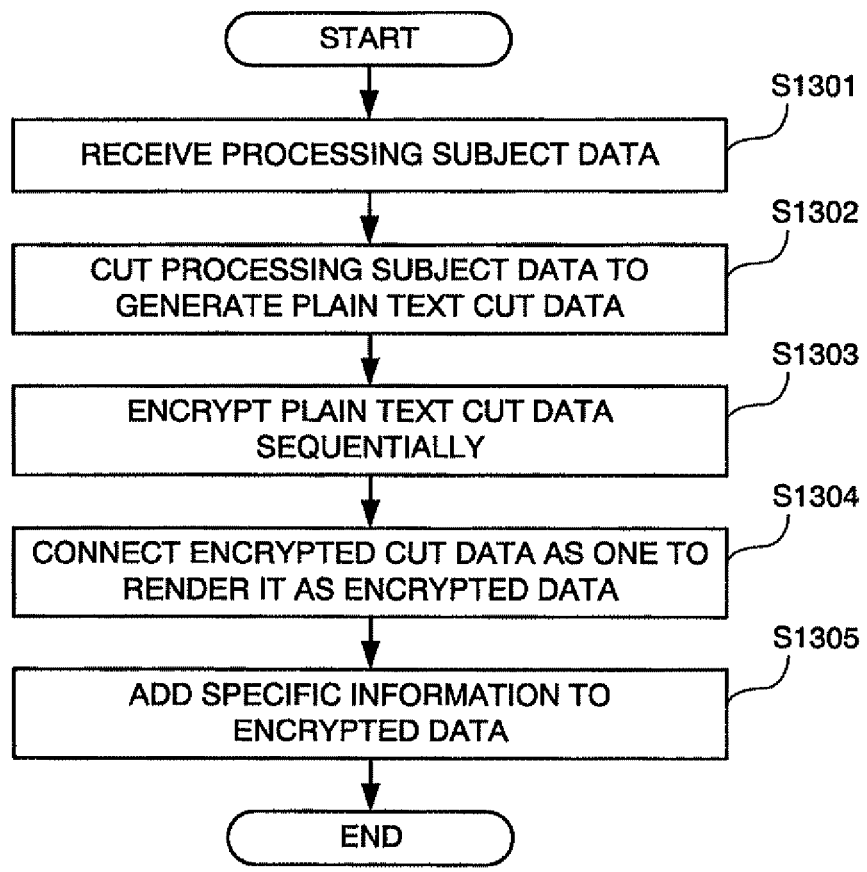
FIG. 12 is a flowchart showing the flow of a process executed in S140 shown in FIG. 9.

The encryption process of the encryption apparatus 27B is performed in approximately the same flow as that of the first data processing apparatus 11 (FIG. 12).

The subject data transmitted to the encryption apparatus 27B is received by the interface portion 271B (S1301).

The interface portion 271B transmits it to the preprocessing portion 272B.

The preprocessing portion 272B cuts the received subject data by a predetermined number of bits, and generates the plain text cut data (S1302). The method of cutting the subject data in this case does not have to be the same as that of the encryption apparatus 27 and encryption apparatus 27A. According to this embodiment, however, the same process as that described about the encryption apparatus 27 and encryption apparatus 27A is performed to cut the subject data. The preprocessing portion 272B performs the same process as that described about the encryption apparatus 27 so as to include the dummy data in the plain text cut data as required.

Next, the plain text cut data is transmitted to the encrypting and decrypting portion 273B. The encrypting and decrypting portion 273B encrypts it to rendered as the encrypted cut data (S1303).

Here, the algorithm and key to be used for the encryption are generated as in the case of the encryption apparatus 27. The solutions are also generated before this as in the case of the encryption apparatus 27. The flow from the generation of the solutions to the generation of the algorithm and key will be described hereunder.

When the interface portion 271B receives the subject data from the bus 29, the solution generating portion 274B receives that information from the interface portion 271B. The solution generating portion 274B should generate the solutions in appropriate timing. If the solution generating portion 274B of this embodiment receives the information on reception of the subject data from the interface portion 271B, it takes that opportunity to generate the solutions. Details of the generation of the solutions are the same as those described about the encryption apparatus 27.

The generated solutions are transmitted to the algorithm generating portion 275B and key generating portion 276B.

The algorithm generating portion 275B and key generating portion 276B generate the algorithm and key by performing the same process as that performed by the algorithm generating portion 275 and key generating portion 276 of the encryption apparatus 27. The generated algorithm and key are transmitted to the encrypting and decrypting portion 273B from the algorithm generating portion 275B or the key generating portion 276B.

The encrypting and decrypting portion 273B receives the algorithm from the algorithm generating portion 275B and the key from the key generating portion 276B respectively, and sequentially encrypts the plain text cut data received from the preprocessing portion 272B (S1303).

Details of the encryption are the same as those described about the encryption apparatus 27.

The generated encrypted cut data is sequentially transmitted to the connecting portion 277B.

The connecting portion 277B connects the encrypted cut data as one to render it as the encrypted data (S1304). The encrypted data is transmitted to the specific information generating portion 278B.

The specific information generating portion 278B adds the above-mentioned specific information to the header, for instance, of the received encrypted data (S1305).

The encrypted data having the specific information added thereto is transmitted to the bus 29 via the interface portion 271B to be recorded on the HDD 23 in the second data processing apparatus 12.

Next, when the first data processing apparatus 11 sends the second data processing apparatus 12 an instruction to send back the encrypted data recorded on the HDD 23 in the second data processing apparatus 12 to the first data processing apparatus 11 for instance, the second data processing apparatus 12 performs the following process.

Figure 13:
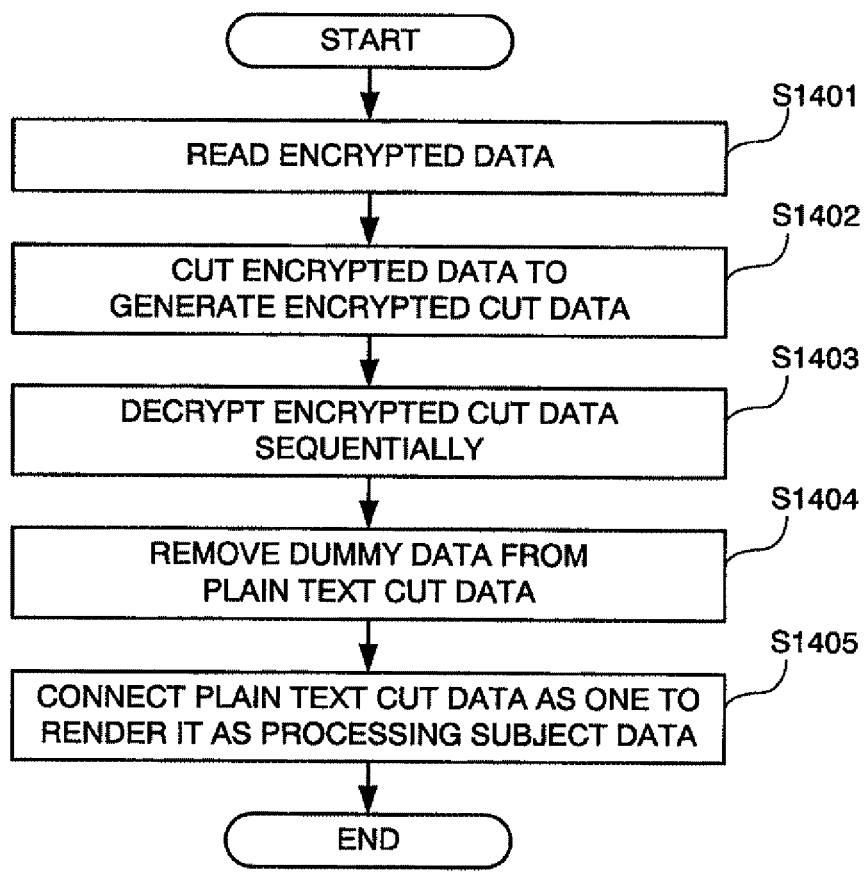
FIG. 13 is a flowchart showing the flow of a process executed in S150 shown in FIG. 9.

First, the encryption apparatus 27B reads the encrypted data from the HDD 23 and decrypts the encrypted data to change it back to the subject data, thereby performing the above-mentioned process of S150. Details of this process will be described by referring to FIG. 13.

To be more precise, the interface portion 271B of the encryption apparatus 27B of the second data processing apparatus 12 reads the encrypted data from the HDD 23 via the bus 29 (S1401).

The interface portion 271B transmits the encrypted data to the preprocessing portion 272B. The preprocessing portion 272B cuts the received encrypted data by a predetermined number of bits to generate the encrypted cut data (S1402).

In the case of generating the encrypted cut data by cutting the encrypted data, the preprocessing portion 272B performs the same process as the above-mentioned process performed by the preprocessing portion 272A of the encryption apparatus 27A on performing the decryption. To be more specific, the encrypted data is cut by 8 bits from the head to be divided into multiple pieces of the encrypted cut data.

Next, the encrypted cut data is transmitted to the encrypting and decrypting portion 273B. The encrypting and decrypting portion 273B decrypts it to rendered as the plain text cut data (S1403).

The decryption is performed as the same process as the above-mentioned process performed by the encrypting and decrypting portion 273A of the encryption apparatus 27A on performing the decryption. To perform such decryption, the second data processing apparatus 12 requires the algorithm and key.

The algorithm and key are generated as follows.

The interface portion 271B of this embodiment can read the specific information added to the encrypted data. The specific information is the information for identifying the algorithm and key used when encrypting the encrypted data for having the specific information added thereto.

For instance, in the case where the specific information is the algorithm and key themselves used when encrypting the encrypted data, the interface portion 271B reads the algorithm and key from the encrypted data and transmits them to the encrypting and decrypting portion 273B via the preprocessing portion 272B for instance. The encrypting and decrypting portion 273B decrypts the encrypted cut data based on the algorithm and key.

In the case where the specific information is the solutions used to generate the algorithm and key used when encrypting the encrypted data, the interface portion 271B reads the solutions from the encrypted data so as to transmit them to the algorithm generating portion 275B and the key generating portion 276B. In this case, the algorithm generating portion 275B and the key generating portion 276B generate the algorithm and key based on the received solutions respectively. The algorithm and key match with the algorithm and key used when encrypting the encrypted data having the solutions added thereto. The algorithm generating portion 275B and the key generating portion 276B transmit the generated algorithm and key to the encrypting and decrypting portion 273B. The encrypting and decrypting portion 273B decrypts the encrypted cut data based on the algorithm and key.

In the case where the specific information is the information indicating what number generated solutions are the solutions used on generating the algorithm and key used when encrypting the encrypted data, the interface portion 271B reads the information from the encrypted data so as to transmit it to the solution generating portion 274B. The solution generating portion 274B having received the information generates the solutions up to the indicated order. The solutions match with those used when encrypting the encrypted data having the above-mentioned information added thereto. In this case, at least the initial matrixes should be held without being erased so that the solutions generated in the same order are always the same. The solution generating portion 274B transmits the generated solutions to the algorithm generating portion 275B and the key generating portion 276B. The algorithm generating portion 275B and the key generating portion 276B generate the algorithm and key based on the received solutions respectively. The algorithm and key match with the algorithm and key used when encrypting the encrypted data having the solutions added thereto respectively. The algorithm generating portion 275B and the key generating portion 276B transmit the generated algorithm and key to the encrypting and decrypting portion 273B. The encrypting and decrypting portion 273B decrypts the encrypted cut data based on the algorithm and key.

The encrypted cut data is changed back to the plain text cut data as described above.

Next, the encrypting and decrypting portion 273B removes the dummy data from the plain text cut data as required (S1404).

Here, if the dummy data included in the plain text cut data is included at an appropriate position based on the solutions, the encrypting and decrypting portion 273B requires the solutions used on encrypting the plain text cut data last time when removing the dummy data. In the case where the specific information is the solutions used when the plain text cut data was encrypted last time, the interface portion 271B transmits the solutions to the encrypting and decrypting portion 273B. In the case where the specific information is the information indicating what number generated solutions are the solutions used when the plain text cut data was encrypted last time, the solution generating portion 274B transmits the generated solutions to the encrypting and decrypting portion 273B. The encrypting and decrypting portion 273B removes the dummy data included at the appropriate position based on the solutions by using the solutions.

In the case of including the dummy data included in the plain text cut data at an appropriate position based on the solutions, it is not desirable to render the specific information as the algorithm and key used when encrypting the encrypted data. It is because, if rendered so, the encrypting and decrypting portion 273B cannot obtain the solutions so that the dummy data cannot be removed.

The plain text cut data from which the dummy data has been removed is transmitted to the connecting portion 277B. The plain text cut data is connected as one by the connecting portion 277B to be changed back to the subject data (S1405).

The plain text cut data is transmitted to the bus 29 via the interface portion 271B, and is then transmitted to the encryption apparatus 27A associated with the first data processing apparatus 11 which requested transmission of the encrypted data as a source of the plain text cut data.

On receiving this, the encryption apparatus 27A performs the above-mentioned process of S160 of encrypting the subject data to render it as the encrypted data.

The encryption apparatus 27A performs this process as the same one as the process described in S110 performed by the encryption apparatus 27 of the first data processing apparatus 11 on rendering the subject data as the encrypted data.

The encrypted data generated on the encryption apparatus 27A is transmitted to the communication apparatus 28 of the second data processing apparatuses 12 via the bus 29, and is transmitted from there to the communication apparatus 28 of the first data processing apparatus 11 which requested transmission of the encrypted data via the network 13. This corresponds to the above-mentioned process of S170.

The encrypted data is decrypted on the encryption apparatus 27 in the first data processing apparatus 11. This is the above-mentioned process of S180. The encryption apparatus 27 performs this process as the same process as the process described in S130 performed by the encryption apparatus 27A of the second data processing apparatus 12 on decrypting the encrypted data as the subject data.

In short, the encryption apparatus 27 built into each of the first data processing apparatuses 11 of this embodiment and the encryption apparatus 27A in the second data processing apparatuses 12 associated with that first data processing apparatus 11 are capable of mutually decrypting the encrypted data encrypted by the other.

The subject data decrypted and generated on the encryption apparatus 27 in the first data processing apparatus 11 is the same as the data which was on the HDD 23 in the first data processing apparatus 11 before the process of S110 was performed. The subject data is recorded on the HDD 23 in the first data processing apparatus 11 for instance. The first data processing apparatus 11 can use it as appropriate.

<<Second Embodiment>>

There is only one data processing apparatus according to the second embodiment.

The hardware configuration of the data processing apparatus of the second embodiment is the same as that of the first data processing apparatus 11 of the first embodiment. However, the data processing apparatus of the second embodiment does not need to communicate, and so it does not have the communication apparatus 28 provided to the first data processing apparatus 11.

To be more specific, the data processing apparatus of the second embodiment includes a CPU 21, an ROM 22, an HDD 23, an RAM 24, an input apparatus 25, a display apparatus 26, an encryption apparatus 27 and a bus 29. The functions thereof basically match with the functions of the CPU 21, ROM 22, HDD 23, RAM 24, input apparatus 25, display apparatus 26, encryption apparatus 27 and bus 29 of the first data processing apparatus 11.

The configuration of the encryption apparatus 27 of the data processing apparatus of the second embodiment is almost the same as the configuration of the encryption apparatus 27 built into the first data processing apparatus 11 of the first embodiment (shown in FIG. 4). However, it is different from the encryption apparatus 27 of the first embodiment in that the algorithm generating portion 275 is replaced by a first algorithm generating portion 275X and a second algorithm generating portion 275Y, and the key generating portion 276 is replaced by a first key generating portion 276X and a second key generating portion 276Y (FIG. 14).

The data processing apparatus of the second embodiment performs the processes of encrypting the subject data recorded on the HDD 23 with the encryption apparatus 27, recording the encrypted data generated by the encryption on the HDD 23, decrypting the encrypted data recorded on the HDD 23 with the encryption apparatus 27 and recording the subject data generated by the decryption on the HDD 23 as will be described later. According to the second embodiment multiple pieces of the encrypted data are decrypted, and the order of decrypting the encrypted data matches with the order in which the encrypted data was encrypted from the subject data.

There arise the differences, in conjunction with this point, between the encryption apparatus 27 of the data processing apparatus of the second embodiment and the encryption apparatus 27 built into the first data processing apparatus 11 of the first embodiment.

Figure 14:
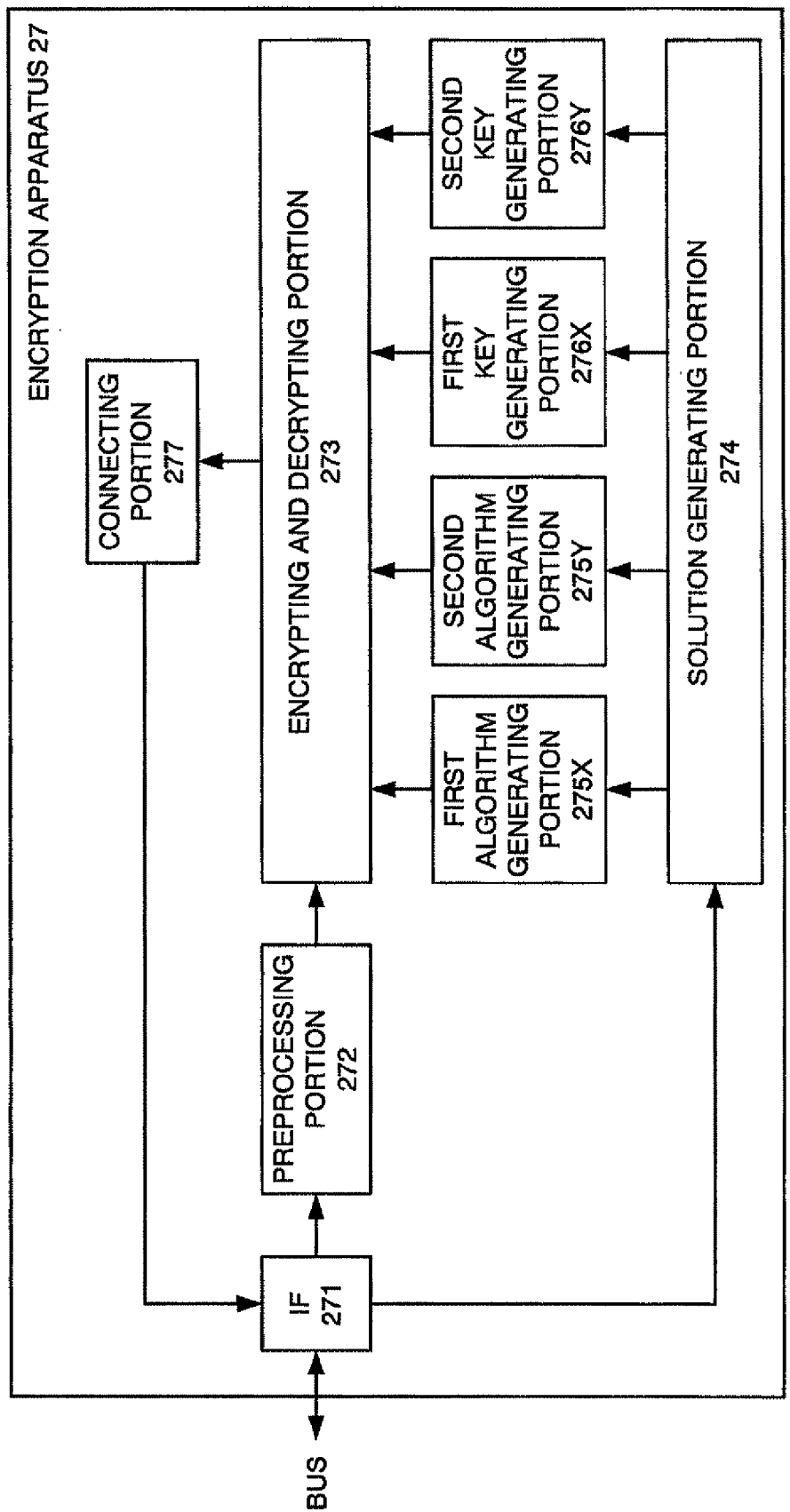
FIG. 14 is a diagram showing the hardware configuration of the encryption apparatus included in the data processing apparatus of a second embodiment.

The encryption apparatus 27 of the data processing apparatus of the second embodiment has the configuration shown in FIG. 14 as described above.

The encryption apparatus 27 in the data processing apparatus of the second embodiment has an interface portion 271, a preprocessing portion 272, an encrypting and decrypting portion 273, a solution generating portion 274 and a connecting portion 277, which have basically the same functions as those in the encryption apparatus 27 of the first data processing apparatus 11 of the first embodiment. The interface portion 271 exchanges the data between the bus 29 and the communication apparatus 28.

The preprocessing portion 272 cuts the subject data or encrypted data received from the bus 29 via the interface portion 271 by a predetermined number of bits to generate the plain text cut data or the encrypted cut data and transmits them to the encrypting and decrypting portion 273. The preprocessing portion 272 may include the dummy data in the plain text cut data.

The encrypting and decrypting portion 273 receives the plain text cut data or encrypted cut data from the preprocessing portion 272, encrypts the plain text cut data if received and decrypts the encrypted cut data if received. The encrypting and decrypting portion 273 has the standard number of bits as the processing unit for performing the processing of the encryption and decryption fixed at 8 bits according to this embodiment.

The solution generating portion 274 sequentially generates the solutions. According to this embodiment, the solutions are generated each time the preprocessing portion 272 receives the subject data. The solutions are pseudo-random numbers.

The connecting portion 277 has a function of connecting the plain text cut data generated by decrypting the encrypted cut data in the encrypting and decrypting portion 273 in original order to render it as a set of the subject data. The connecting portion 277 also has a function of connecting the encrypted cut data generated by encrypting the plain text cut data in the encrypting and decrypting portion 273 to render it as a set of the encrypted data.

The first algorithm generating portion 275X generates the algorithm based on the solutions received from the solution generating portion 274. The algorithm is used when performing the encryption. The second algorithm generating portion 275Y generates the algorithm based on the solutions received from the solution generating portion 274. The algorithm is used when performing the decryption. The first algorithm generating portion 275X and the second algorithm generating portion 275Y generate the same algorithm in the case of generating the algorithm by using the same solutions.

The first key generating portion 276X generates the key based on the solutions received from the solution generating portion 274. The key is used when performing the encryption. The second key generating portion 276Y generates the key based on the solutions received from the solution generating portion 274. The key is used when performing the decryption. The first key generating portion 276X and the second key generating portion 276Y generate the same key in the case of generating the key by using the same solutions.

According to this embodiment, the first algorithm generating portion 275X and the first key generating portion 276X generate the algorithm and key each time the preprocessing portion 272 receives the subject data. And the second algorithm generating portion 275Y and the second key generating portion 276Y generate the algorithm and key each time the preprocessing portion 272 receives the encrypted data.

Figure 15:
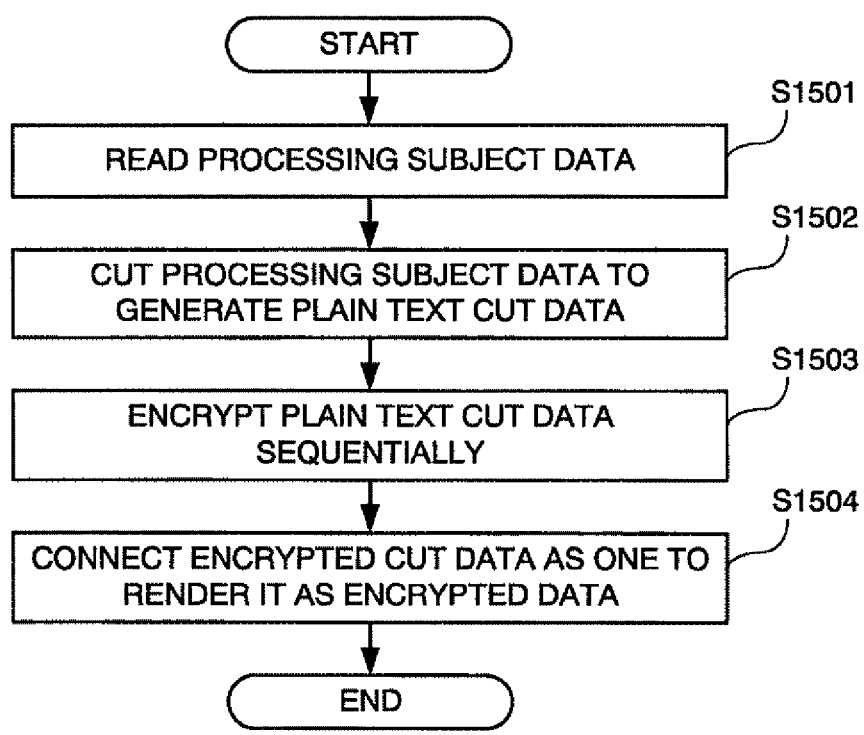
FIG. 15 is a flowchart showing the flow of an encryption process executed in the data processing apparatus of the second embodiment.

Operations of the data processing apparatuses of the second embodiment will be described by using FIG. 15.

First, the subject data is read (S1501). The subject data is read from the HDD 23 according to this embodiment. The subject data is transmitted to the encryption apparatus 27 from the HDD 23 via the bus 29. To be more precise, the subject data is transmitted to the preprocessing portion 272 via the interface portion 271.

The subject data is cut by a predetermined number of bits to be rendered as the plain text cut data in the preprocessing portion 272 (S1502). The preprocessing portion 272 includes the dummy data in the plain text cut data as required.

The method of generating the plain text cut data from the subject data is the same as that described in S1102 of the first embodiment.

On receiving the information on reception of the subject data from the interface portion 271, the solution generating portion 274 takes the opportunity to generate the solutions. The solutions may be generated each time the subject data is cut in the preprocessing portion 272. In this case, the generation of the subject data in the preprocessing portion 272 is synchronized with the generation of the solutions in the solution generating portion 274.

The method of generating the solutions of this embodiment is the same as the method performed by the solution generating portion 274 when the first data processing apparatus 11 of the first embodiment performed the encryption.

The generated solutions are transmitted to the first algorithm generating portion 275X, second algorithm generating portion 275Y, first key generating portion 276X and second key generating portion 276Y.

The first algorithm generating portion 275X and first key generating portion 276X having received this generate the algorithm and key respectively. The method of generating the algorithm and key of this embodiment is the same as the method performed by the algorithm generating portion 275 and key generating portion 276 when the first data processing apparatus 11 of the first embodiment generated the algorithm and key.

The first algorithm generating portion 275X and first key generating portion 276X transmit the generated algorithm and key to the encrypting and decrypting portion 273.

The encrypting and decrypting portion 273 encrypts the plain text cut data received from the preprocessing portion 272 based on the algorithm received from the first algorithm generating portion 275X and the key received from the first key generating portion 276X (S1503). This process is performed as the same process as that of S1103 described in the first embodiment.

The encrypted cut data thus generated is transmitted to the connecting portion 277 and connected as one there to be rendered as the encrypted data (S1504).

The encrypted data generated as above is recorded on the HDD 23 in the data processing apparatus via the bus 29.

Such an encryption process is performed a number of times in this embodiment.

The data processing apparatus decrypts the encrypted data recorded on the HDD 23.

Figure 16:
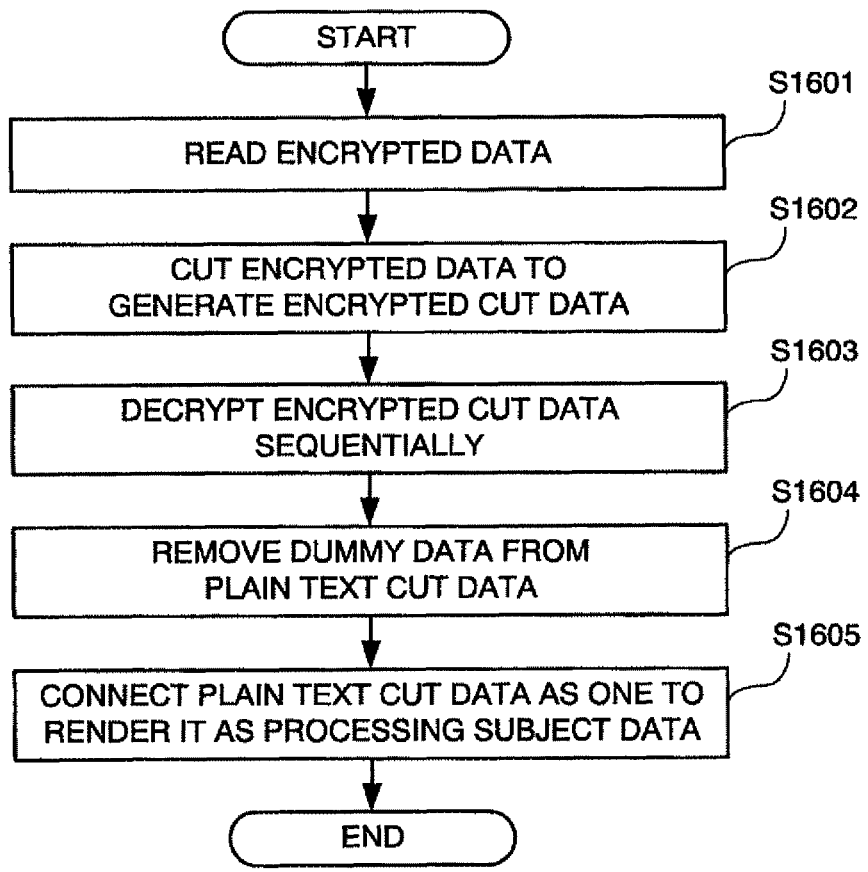
FIG. 16 is a flowchart showing the flow of a decryption process executed in the data processing apparatus of the second embodiment.

Hereunder, the step of the decryption will be described in detail by referring to FIG. 16.

The decryption is started by having the encrypted data recorded on the HDD 23 read by the encryption apparatus 27 (S1601).

If the preprocessing portion 272 in the encryption apparatus 27 receives the encrypted data from the HDD 23 via the interface portion 271, the preprocessing portion 272 cuts the received encrypted data by a predetermined number of bits to generate the encrypted cut data (S1602).

In the case of generating the encrypted cut data by cutting the encrypted data, the preprocessing portion 272 performs a process reverse to the process performed as the above-mentioned encryption process. To be more specific, the encrypted data is cut by 8 bits from the head to be divided into multiple pieces of the encrypted cut data. This process is the same process as that of S1203 of the first embodiment.

Next, the encrypted cut data is transmitted to the encrypting and decrypting portion 273, where it is decrypted and rendered as the plain text cut data (S1603).

The decryption is performed as a process reverse to the above-mentioned encryption process performed by the encrypting and decrypting portion 273. For that reason, the encrypting and decrypting portion 273 requires the algorithm and key used on performing the encryption. Here, the second algorithm generating portion 275Y generates the algorithm and the second key generating portion 276Y generates the key by using the solutions generated in advance. As the order in which the encrypted data is decrypted matches with the order in which the encrypted data was encrypted from the subject data, the algorithm and key generated by the second algorithm generating portion 275Y and the second key generating portion 276Y are generated based on the solutions used when encrypting the encrypted data about to be decrypted. It means that the algorithm generated by the second algorithm generating portion 275Y and the key generated by the second key generating portion 276Y match with the algorithm and key used when encrypting the encrypted data about to be decrypted.

After having the solutions generated by the solution generating portion 274, the second algorithm generating portion 275Y and the second key generating portion 276Y may generate the algorithm and key in any timing before the encrypting and decrypting portion 273 requires the algorithm and key for the sake of performing the decryption.

The algorithm generated by the second algorithm generating portion 275Y and the key generated by the second key generating portion 276Y are transmitted to the encrypting and decrypting portion 273. The encrypting and decrypting portion 273 uses the algorithm and key to sequentially decrypt the encrypted cut data and render it as the plain text cut data. This process is performed as the same process as the process described in S1204 of the first embodiment.

Next, the encrypting and decrypting portion 273 removes the dummy data from the plain text cut data as required (S1604). This process is performed as the same process as the process in S1205 of the first embodiment.

The plain text cut data thus generated is transmitted to the connecting portion 277. The connecting portion 277 connects the received plain text cut data as one and generates the subject data (S1605).

The generated subject data is transmitted from the connecting portion 277 to the interface portion 271, and is then recorded on the HDD 23 via the bus 29.

DEFORMED EXAMPLE

The data processing apparatus of the second embodiment may be deformed as follows.

The data processing apparatus of this deformed example has a configuration of the encryption apparatus 27 slightly different from the data processing apparatus of the second embodiment. Otherwise, it is the same as the above-mentioned data processing apparatus of the second embodiment.

Figure 17:
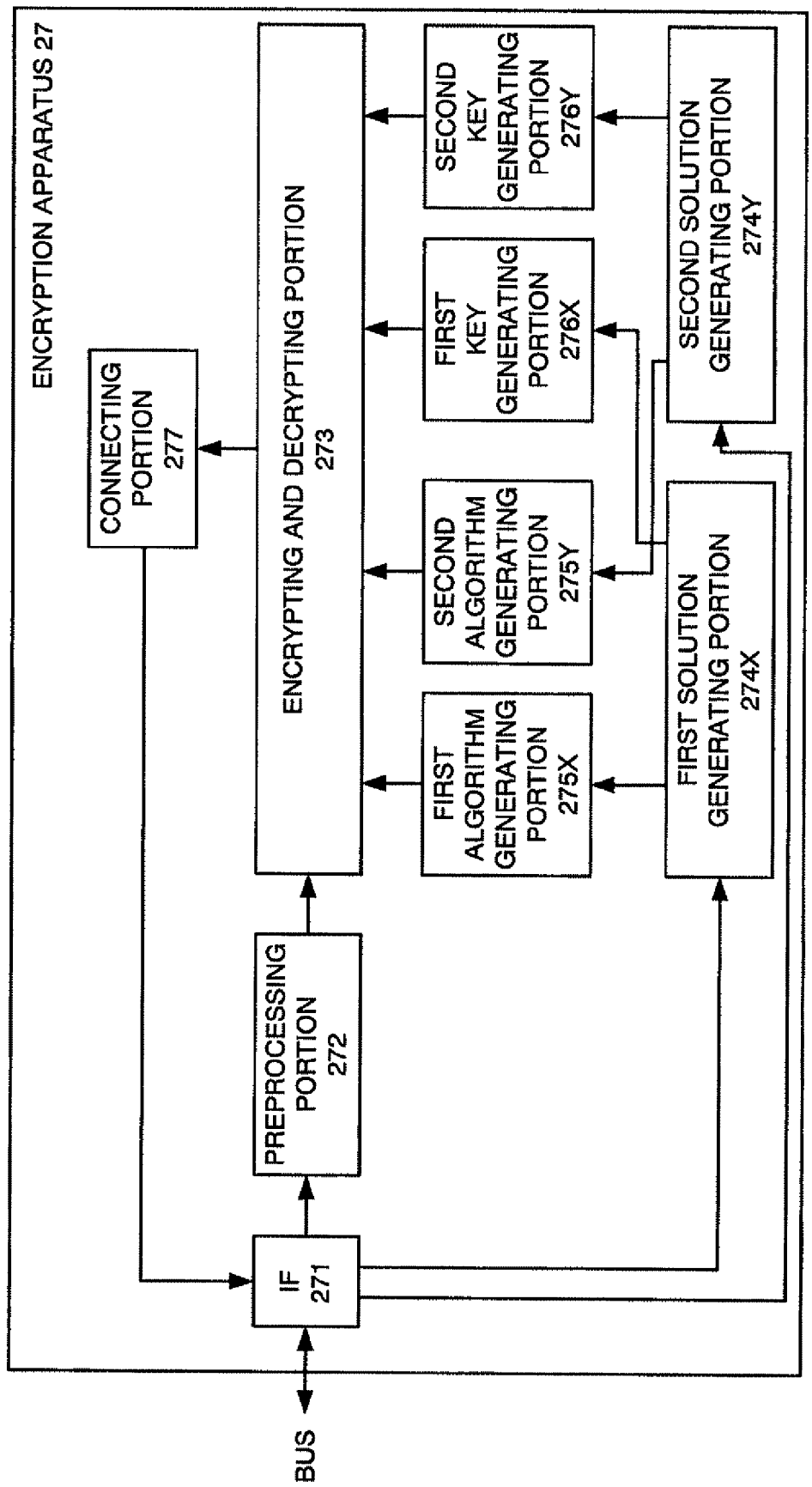
FIG. 17 is a diagram showing the hardware configuration of the encryption apparatus included in a deformed example of the data processing apparatus of the second embodiment.

The encryption apparatus 27 of the deformed example is configured as shown in FIG. 17. This encryption apparatus 27 is different from the encryption apparatus 27 of the data processing apparatus of the second embodiment having only one solution generating portion 274 in that it has two solution generating portions of a first solution generating portion 274X and a second solution generating portion 274Y.

Both the first solution generating portion 274X and second solution generating portion 274Y generate the solutions as with the solution generating portion 274 of the second embodiment.

On receiving the information from the interface portion 271 that the interface portion 271 received the subject data, the first solution generating portion 274X takes the opportunity to generate the solutions. The first solution generating portion 274X may also generate the solutions each time the subject data is cut in the preprocessing portion 272. The solutions generated by the first solution generating portion 274X are transmitted to the first algorithm generating portion 275X and first key generating portion 276X. As in the case of the second embodiment, the first algorithm generating portion 275X and first key generating portion 276X having received the solutions generate the algorithm and key respectively, and transmit them to the encrypting and decrypting portion 273. The encrypting and decrypting portion 273 performs the encryption process by using the algorithm and the key received from the first algorithm generating portion 275X and first key generating portion 276X.

On receiving the information from the interface portion 271 that the interface portion 271 received the encrypted data, the second solution generating portion 274Y generates the solutions. However, the second solution generating portion 274Y may also generate the solutions each time the encrypted data is cut in the preprocessing portion 272. The solutions generated by the second solution generating portion 274Y are transmitted to the second algorithm generating portion 275Y and second key generating portion 276Y. As in the case of the second embodiment, the second algorithm generating portion 275Y and second key generating portion 276Y having received the solutions generate the algorithm and key respectively, and transmit them to the encrypting and decrypting portion 273. The encrypting and decrypting portion 273 performs the decryption process by using the algorithm and key received from the second algorithm generating portion 275Y and second key generating portion 276Y.

The solutions generated by the second solution generating portion 274Y are the same solutions as those generated by the first solution generating portion 274X if the solutions generated in the same order are mutually compared On this point, it is the same as the first embodiment wherein the solution generating portion 274 in the encryption apparatus 27 built into the first data processing apparatus 11 and the solution generating portion 274A in the encryption apparatus 27A built into the second data processing apparatuses 12 generate the same solutions if the solutions generated in the same order are mutually compared. To be more specific, the second solution generating portion 274Y and the first solution generating portion 274X of the deformed example have the same solution generating algorithm and also have the same initial matrix.

The data processing apparatus of this deformed example performs the same processes as the data processing apparatus of the second embodiment except the processes of generating the solutions and generating the algorithm.

The encryption apparatuses of the second embodiment and the deformed example thereof may be replaced by the encryption apparatus 27B of the first embodiment.

The invention claimed is:

1. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising:
   cutting means for cutting the subject data by a predetermined number of bits into multiple pieces of plain text cut data and also cutting the encrypted data into multiple pieces of encrypted cut data by the same number of bits by which the encrypted data is cut when encrypted;
   encrypting and decrypting means for encrypting the plain text cut data with the key and the algorithm changing in predetermined timing to render it as the encrypted cut data and decrypting the encrypted cut data with the key and algorithm used when encrypting the encrypted cut data to render it as the plain text cut data, the means performing the encryption or the decryption per standard number of bits as a standard;
   reading and writing means for recording on the recording medium the encrypted data having the encrypted cut data encrypted by the encrypting and decrypting means connected as one and reading the encrypted data recorded on the recording medium from the recording medium;
   connecting means for connecting the decrypted plain text cut data to render it as the subject data; and
   specific information recording means for recording specific information for identifying the algorithm used when encrypting the subject data on a predetermined recording medium by associating it with the encrypted data, and wherein:
   the cutting means cuts the subject data by the number of bits shorter than the standard number of bits; and
   having mixing means provided for the sake of matching the number of bits of the plain text cut data with the standard number of bits by including dummy data irrelevant to the subject data in the plain text cut data; and
   when decrypting the encrypted cut data, the encrypting and decrypting means reads the specific information associated with the encrypted data from the specific information recording means, and performs the decryption with the key and the algorithm identified based on the specific information.

2. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising:
   cutting means for cutting the subject data by a predetermined number of bits into multiple pieces of plain text cut data and also cutting the encrypted data into multiple pieces of encrypted cut data by the same number of bits by which the encrypted data is cut when encrypted;
   encrypting and decrypting means for encrypting the plain text cut data with the algorithm and the key changing in predetermined timing to render it as the encrypted cut data and decrypting the encrypted cut data with the key and algorithm used when encrypting the encrypted cut data to render it as the plain text cut data, the means performing the encryption or the decryption per standard number of bits as a standard;
   reading and writing means for recording on the recording medium the encrypted data having the encrypted cut data encrypted by the encrypting and decrypting means connected as one and reading the encrypted data recorded on the recording medium from the recording medium;
   connecting means for connecting the decrypted plain text cut data to render it as the subject data; and
   specific information recording means for recording specific information for identifying the key used when encrypting the subject data on a predetermined recording medium by associating it with the encrypted data, and wherein:
   the cutting means cuts the subject data by the number of bits shorter than the standard number of bits; and
   having mixing means provided for the sake of matching the number of bits of the plain text cut data with the standard number of bits by including dummy data irrelevant to the subject data in the plain text cut data; and
   when decrypting the encrypted cut data, the encrypting and decrypting means reads the specific information associated with the encrypted data from the specific information recording means, and performs the decryption with the algorithm and the key identified based on the specific information.

3. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising:
   cutting means for cutting the subject data by a predetermined number of bits into multiple pieces of plain text cut data and also cutting the encrypted data into multiple pieces of encrypted cut data by the same number of bits by which the encrypted data is cut when encrypted;
   solution generating means for sequentially generating solutions which are pseudo-random numbers;
   encrypting and decrypting means for encrypting the, plain text cut data with the key and the algorithm generated based on the solutions to render it as the encrypted cut data and decrypting the encrypted cut data with the key and algorithm used when encrypting the encrypted cut data to render it as the plain text cut data, the means performing the encryption or the decryption per standard number of bits as a standard;
   reading and writing means for recording on the recording medium the encrypted data having the encrypted cut data encrypted by the encrypting and decrypting means connected as one and reading the encrypted data recorded on the recording medium from the recording medium;
   connecting means for connecting the decrypted plain text cut data to render it as the subject data; and
   specific information recording means for recording specific information for identifying the algorithm used when encrypting the subject data on a predetermined recording medium by associating it with the encrypted data, and mixing means for matching the number of bits of the plain text cut data with the standard number of bits by including dummy data irrelevant to the subject data in the plain text cut data; and wherein:

the cutting means cuts the subject data by the number of bits shorter than the standard number of bits; and when decrypting the encrypted cut data, the encrypting and decrypting means reads the specific information associated with the encrypted data from the specific information recording means, and performs the decryption with the key and the algorithm identified based on the specific information.

4. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data, comprising:

cutting means for cutting the subject data by a predetermined number of bits into multiple pieces of plain text cut data and also cutting the encrypted data into multiple pieces of encrypted cut data by the same number of bits by which the encrypted data is cut when encrypted;

solution generating means for sequentially generating solutions which are pseudo-random numbers;

encrypting and decrypting means for encrypting the plain text cut data with the algorithm and the key generated based on the solutions to render it as the encrypted cut data and decrypting the encrypted cut data with the key and algorithm used when encrypting the encrypted cut data to render it as the plain text cut data, the means performing the encryption or the decryption per standard number of bits as a standard;

reading and writing means for recording on the recording medium the encrypted data having the encrypted cut data encrypted by the encrypting and decrypting means connected as one and reading the encrypted data recorded on the recording medium from the recording medium;

connecting means for connecting the decrypted plain text cut data to render it as the subject data; and specific information recording means for recording specific information for identifying the key used when encrypting the subject data on a predetermined recording medium by associating it with the encrypted data, and mixing means for matching the number of bits of the plain text cut data with the standard number of bits by including dummy data irrelevant to the subject data in the plain text cut data; and wherein:

the cutting means cuts the subject data by the number of bits shorter than the standard number of bits; and when decrypting the encrypted cut data, the encrypting and decrypting means reads the specific information associated with the encrypted data from the specific information recording means, and performs the decryption with the algorithm and the key identified based on the specific information.

5. The data processing apparatus according to claim 3, wherein the cutting means cuts the subject data to a predetermined number of bits shorter than the standard number of bits.

6. The data processing apparatus according to claim 5, wherein the mixing means includes the dummy data at a same position of the plain text cut data.

7. The data processing apparatus according to claim 5, wherein the mixing means includes the dummy data at a predetermined position different for each individual piece of the plain text cut data.

8. The data processing apparatus according to claim 5, wherein the cutting means cuts the subject data so that at least a piece of the plain text cut data has the number of bits different from the other pieces of the plain text cut data.

9. The data processing apparatus according to claim 7, wherein the mixing means decides the predetermined position for including the dummy data based on the solutions.

10. The data processing apparatus according to claim 8, wherein the cutting means cuts the subject data so that at least a piece of the plain text cut data has the number of bits different from the other pieces of the plain text cut data based on the solutions.

11. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising:

cutting means for cutting the subject data by a predetermined number of bits into multiple pieces of plain text cut data and also cutting the encrypted data into multiple pieces of encrypted cut data by the same number of bits by which the encrypted data is cut when encrypted;

solution generating means for sequentially generating new solutions each time the subject data is encrypted by assigning past solutions to a predetermined solution generating algorithm capable of generating a new solution by assigning at least one of the past solutions thereto;

first algorithm generating means for sequentially generating new algorithms each time the subject data is encrypted by using the generated solutions;

second algorithm generating means for sequentially generating the same new algorithms as those generated by the first algorithm generating means each time the encrypted data is decrypted by using the generated solutions;

encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data, the means performing the encryption or the decryption per standard number of bits as a standard;

reading and writing means for recording on the recording medium the encrypted data having the encrypted cut data encrypted by the encrypting and decrypting means connected as one and reading the encrypted data recorded on the recording medium from the recording medium;

connecting means for connecting the decrypted plain text cut data to render it as the subject data; and wherein:

the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data.

12. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising:

cutting means for cutting the subject data by a predetermined number of bits into multiple pieces of plain text cut data and also cutting the encrypted data into multiple pieces of encrypted cut data by the same number of bits by which the encrypted data is cut when encrypted;

solution generating means for sequentially generating new solutions each time the subject data is encrypted by assigning past solutions to a predetermined solution generating algorithm capable of generating a new solution by assigning at least one of the past solutions thereto;

first key generating means for sequentially generating new keys each time the subject data is encrypted by using the generated solutions;

second key generating means for sequentially generating the same new keys as those generated by the first key generating means each time the encrypted data is decrypted by using the generated solutions;

encrypting and decrypting means for encrypting the plain text cut data with the algorithm and the key generated by the first generating means to render it as the encrypted cut data and decrypting the encrypted cut data with the algorithm used when encrypting the encrypted cut data and the same key as that used when encrypting the encrypted data generated by the second key generating means to render it as the plain text cut data, the means performing the encryption or the decryption per standard number of bits as a standard;

reading and writing means for recording on the recording medium the encrypted data having the encrypted cut data encrypted by the encrypting and decrypting means connected as one and reading the encrypted data recorded on the recording medium from the recording medium;

connecting means for connecting the decrypted plain text cut data to render it as the subject data; and wherein:

the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data.

13. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising:

cutting means for cutting the subject data by a predetermined number of bits into multiple pieces of plain text cut data and also cutting the encrypted data into multiple pieces of encrypted cut data by the same number of bits by which the encrypted data is cut when encrypted;

first solution generating means for sequentially generating new solutions each time the subject data is encrypted by assigning past solutions to a predetermined solution generating algorithm capable of generating a new solution by assigning at least one of the past solutions thereto;

first algorithm generating means for sequentially generating new algorithms each time the subject data is encrypted by using the solutions generated by the first solution generating means;

second solution generating means for sequentially generating the same new solutions as those generated by the first solution generating means each time the encrypted data is decrypted by assigning past solutions to a predetermined solution generating algorithm capable of generating a new solution by assigning at least one of the past solutions thereto;

second algorithm generating means for sequentially generating the same new algorithms as those generated by the first algorithm generating means each time the encrypted data is decrypted by using the solutions generated by the second solution generating means;

encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data, the means performing the encryption or the decryption per standard number of bits as a standard;

reading and writing means for recording on the recording medium the encrypted data having the encrypted cut data encrypted by the encrypting and decrypting means connected as one and reading the encrypted data recorded on the recording medium from the recording medium;

connecting means for connecting the decrypted plain text cut data to render it as the subject data; and wherein:

the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data.

14. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising:

cutting means for cutting the subject data by a predetermined number of bits into multiple pieces of plain text cut data and also cutting the encrypted data into multiple pieces of encrypted cut data by the same number of bits by which the encrypted data is cut when encrypted;

first solution generating means for sequentially generating new solutions each time the subject data is encrypted by assigning past solutions to a predetermined solution generating algorithm capable of generating a new solution by assigning at least one of the past solutions thereto;

first key generating means for sequentially generating new keys each time the subject data is encrypted by using the solutions generated by the first solution generating means;

second solution generating means for sequentially generating the same new solutions as those generated by the first solution generating means each time the encrypted data is decrypted by assigning past solutions to a predetermined solution generating algorithm capable of generating a new solution by assigning at least one of the past solutions thereto;

second key generating means for sequentially generating the same new keys as those generated by the first key generating means each time the encrypted data is decrypted by using the solutions generated by the second solution generating means;

encrypting and decrypting means for encrypting the plain text cut data with the algorithm and the key generated by the first key generating means to render it as the encrypted cut data and decrypting the encrypted cut data with the algorithm used when encrypting the encrypted cut data and the same key as that used when encrypting the encrypted data generated by the second key generating means to render it as the plain text cut data, the means performing the encryption or the decryption per standard number of bits as a standard;

reading and writing means for recording on the recording medium the encrypted data having the encrypted cut data encrypted by the encrypting and decrypting means connected as one and reading the encrypted data recorded on the recording medium from the recording medium;

connecting means for connecting the decrypted plain text cut data to render it as the subject data; and wherein:

the cutting means cuts the subject data by the number of bits shorter than the standard number of bits; and having mixing means provided for the sake of matching the number of bits of the plain text cut data with the standard number of bits by including dummy data irrelevant to the subject data in the plain text cut data.

15. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising:

cutting means, for cutting the subject data by a predetermined number of bits into multiple pieces of plain text cut data and also cutting the encrypted data into multiple pieces of encrypted cut data by the same number of bits by which the encrypted data is cut when encrypted;

first solution generating means for sequentially generating new solutions each time the subject data is encrypted by assigning past solutions to a predetermined solution generating algorithm capable of generating a new solution by assigning at least one of the past solutions thereto;

first algorithm generating means for sequentially generating new algorithms each time the subject data is encrypted by using the solutions generated by the first solution generating means;

second solution generating means for sequentially generating the same new solutions as those generated by the first solution generating means each time the encrypted data is decrypted by assigning past solutions to a predetermined solution generating algorithm capable of generating a new solution by assigning at least one of the past solutions thereto;

second algorithm generating means for sequentially generating the same new algorithms as those generated by the first algorithm generating means each time the encrypted data is decrypted by using the solutions generated by the second solution generating means;

encrypting and decrypting means for encrypting the plain text cut data with the key and the algorithm generated by the first algorithm generating means to render it as the encrypted cut data and decrypting the encrypted cut data with the key used when encrypting the encrypted cut data and the same algorithm as that used when encrypting the encrypted data generated by the second algorithm generating means to render it as the plain text cut data, the means performing the encryption or the decryption per standard number of bits as a standard;

reading and writing means for recording on the recording medium the encrypted data having the encrypted cut data encrypted by the encrypting and decrypting means connected as one and reading the encrypted data recorded on the recording medium from the recording medium;

connecting means for connecting the decrypted plain text cut data to render it as the subject data; and wherein:

the cutting means cuts the subject data by the number of bits shorter than the standard number of bits so that at least a piece of the subject data has the number of bits different from the other pieces of the subject data; and having mixing means provided for the sake of matching the number of bits of the plain text cut data with the standard number of bits by including dummy data irrelevant to the subject data in the plain text cut data.

16. A data processing apparatus including means for encrypting subject data in plain text by using a predetermined algorithm and a predetermined key to render it as encrypted data, a recording medium for recording the encrypted data, and means for decrypting the encrypted data read from the recording medium by using the algorithm and key used when encrypting the encrypted data to render it as the subject data so as to encrypt multiple pieces of the subject data to render them as the encrypted data and decrypt multiple pieces of the encrypted data in the same order as the order used on encryption thereof, comprising:

cutting means for cutting the subject data by a predetermined number of bits into multiple pieces of plain text cut data and also cutting the encrypted data into multiple pieces of encrypted cut data by the same number of bits by which the encrypted data is cut when encrypted;

first solution generating means for sequentially generating new solutions each time the subject data is encrypted by assigning past solutions to a predetermined solution generating algorithm capable of generating a new solution by assigning at least one of the past solutions thereto;

first key generating means for sequentially generating new keys each time the subject data is encrypted by using the solutions generated by the first solution generating means;

second solution generating means for sequentially generating the same new solutions as those generated by the first solution generating means each time the encrypted data is decrypted by assigning past solutions to a predetermined solution generating algorithm capable of generating a new solution by assigning at least one of the past solutions thereto;

second key generating means for sequentially generating the same new keys as those generated by the first key generating means each time the encrypted data is decrypted by using the solutions generated by the second solution generating means;

encrypting and decrypting means for encrypting the plain text cut data with the algorithm and the key generated by the first key generating means to render it as the encrypted cut data and decrypting the encrypted cut data with the algorithm used when encrypting the encrypted cut data and the same key as that used when encrypting the encrypted data generated by the second key generating means to render it as the plain text cut data, the means performing the encryption or the decryption per standard number of bits as a standard;

reading and writing means for recording on the recording medium the encrypted data having the encrypted cut data encrypted by the encrypting and decrypting means connected as one and reading the encrypted data recorded on the recording medium from the recording medium;

connecting means for connecting the decrypted plain text cut data to render it as the subject data; and wherein:

the cutting means cuts the subject data by the number of bits shorter than the standard number of bits so that at least a piece of the subject data has the number of bits different from the other pieces of the subject data; and having mixing means provided for the sake of matching the number of bits of the plain text cut data with the standard number of bits by including dummy data irrelevant to the subject data in the plain text cut data.

17. A data processing system, configured by including:
multiple first data processing apparatuses; and
second data processing apparatuses and third data processing apparatuses of the same number as the first data processing apparatuses pairing off with the first data processing apparatuses respectively, and having:
communication by means of encrypted data having subject data in plain text encrypted performed between the first data processing apparatus and the second data processing apparatus, and communication by means of the subject data performed between the second data processing apparatus and the third data processing apparatus, and configured by including:
a first apparatus having the first data processing apparatuses and a second apparatus having the second data processing apparatuses and the third data processing apparatuses, wherein:
both the first data processing apparatus and the second processing apparatus include:
cutting means for cutting the subject data by a predetermined number of bits into multiple pieces of plain text cut data and also cutting the encrypted data into multiple pieces of encrypted cut data by the same number of bits by which the encrypted data is cut when encrypted;

solution generating means for sequentially generating solutions rendered common between the paired first data processing apparatus and second data processing apparatus and different from those of the other first data processing apparatuses and second data processing apparatuses;

encrypting and decrypting means for encrypting the plain text cut data with an algorithm generated based on the solutions received from the solution generating means and rendered common between the first data processing apparatus and the second data processing apparatus to render it as the encrypted cut data and decrypting the encrypted cut data with the algorithm used when encrypting the encrypted cut data to render it as the plain text cut data;

connecting means for connecting the decrypted plain text cut data to render it as the subject data; and transmitting and receiving means for transmitting and receiving the encrypted data, and wherein:

the third data processing apparatus is the data processing apparatus according to claim 1, which encrypts the subject data generated on the second data processing apparatus by decrypting the encrypted data encrypted on the first data processing apparatus, records the encrypted data on the recording medium and decrypts the encrypted data read from the recording medium to transmit it to the second data processing apparatus.

18. A data processing method executed on a data processing apparatus executing steps of:
encrypting subject data in plain text by using a predetermined algorithm and a predetermined key to render it as encrypted data;
recording the encrypted data on a predetermined recording medium; and
decrypting the encrypted data read from the recording medium by using the algorithm and key used when encrypting the encrypted data to render it as the subject data, the apparatus including the steps of:
cutting the subject data by a predetermined number of bits into multiple pieces of plain text cut data;
encrypting the plain text cut data with the key and the algorithm changing in predetermined timing per standard number of bits as a standard to render it as the encrypted cut data;
recording the encrypted data having the encrypted cut data connected as one on the recording medium;
recording specific information for identifying the algorithm used when encrypting the subject data on a predetermined recording medium by associating it with the encrypted data;
reading the encrypted data recorded on the recording medium from the recording medium;
cutting the encrypted data into multiple pieces of encrypted cut data by the same number of bits by which the encrypted data is cut when encrypted;
decrypting the encrypted cut data with the key and algorithm used when encrypting the encrypted cut data per the standard number of bits to render it as the plain text cut data;
connecting the decrypted plain text cut data to render it as the subject data; and wherein:
the apparatus cuts the subject data by the number of bits shorter than the standard number of bits and matches the number of bits of the plain text cut data with the standard number of bits by including dummy data irrelevant to the subject data in the plain text cut data, and when decrypting the encrypted cut data, it reads the specific information associated with the encrypted data from the predetermined recording medium and performs the decryption with the key and the algorithm identified based on the specific information.

19. A data processing method executed on a data processing apparatus executing steps of:
   encrypting subject data in plain text by using a predetermined algorithm and a predetermined key to render it as encrypted data;
   recording the encrypted data on a predetermined recording medium; and
   decrypting the encrypted data read from the recording medium by using the algorithm and key used when encrypting the encrypted data to render it as the subject data, the apparatus including the steps of:
   cutting the subject data by a predetermined number of bits into multiple pieces of plain text cut data;
   encrypting the plain text cut data with the algorithm and the key changing in predetermined timing per standard number of bits as a standard to render it as the encrypted cut data;
   recording the encrypted data having the encrypted cut data connected as one on the recording medium;
   recording specific information for identifying the key used when encrypting the subject data on a predetermined recording medium by associating it with the encrypted data;
   reading the encrypted data recorded on the recording medium from the recording medium;
   cutting the encrypted data into multiple pieces of encrypted cut data by the same number of bits by which the encrypted data is cut when encrypted;
   decrypting the encrypted cut data with the key and algorithm used when encrypting the encrypted cut data per the standard number of bits as a standard to render it as the plain text cut data;
   connecting means for connecting the decrypted plain text cut data to render it as the subject data; and wherein:
   the apparatus cuts the subject data by the number of bits shorter than the standard number of bits and matches the number of bits of the plain text cut data with the standard number of bits by including dummy data irrelevant to the subject data in the plain text cut data, and when decrypting the encrypted cut data, it reads the specific information associated with the encrypted data from the predetermined recording medium and performs the decryption with the algorithm and the key identified based on the specific information.

20. A data processing method executed on a data processing apparatus executing steps of:
   encrypting subject data in plain text by using a predetermined algorithm and a predetermined key to render it as encrypted data;
   recording the encrypted data on a predetermined recording medium; and
   decrypting the encrypted data read from the recording medium by using the algorithm and key used when encrypting the encrypted data to render it as the subject data, the apparatus including the steps of:
   sequentially generating solutions which are pseudo-random numbers;
   cutting the subject data by a predetermined number of bits into multiple pieces of plain text cut data;
   encrypting the plain text cut data with the key and the algorithm generated based on the solutions per standard number of bits as a standard to render it as the encrypted cut data;
   matching the number of bits of the plain text cut data with the standard number of bits by including dummy data irrelevant to the subject data in the plain text cut data;
   recording the encrypted data having the encrypted cut data connected as one on the recording medium;
   recording specific information for identifying the algorithm used when encrypting the subject data on a predetermined recording medium by associating it with the encrypted data;
   reading the encrypted data recorded on the recording medium from the recording medium;
   cutting the encrypted data into multiple pieces of encrypted cut data by the same number of bits by which the encrypted data is cut when encrypted;
   decrypting the encrypted cut data with the key and algorithm used when encrypting the encrypted cut data per the standard number of bits to render it as the plain text cut data;
   connecting the decrypted plain text cut data to render it as the subject data; and wherein:
   the apparatus cuts the subject data by the number of bits shorter than the standard number of bits so that at least a piece of the plain text cut data has the number of bits different from the other pieces of the plain text cut data, and when decrypting the encrypted cut data, it reads the specific information associated with the encrypted data from the predetermined recording medium and performs the decryption with the key and the algorithm identified based on the specific information.

21. A data processing method executed on a data processing apparatus executing steps of:
   encrypting subject data in plain text by using a predetermined algorithm and a predetermined key to render it as encrypted data;
   recording the encrypted data on a predetermined recording medium; and
   decrypting the encrypted data read from the recording medium by using the algorithm and key used when encrypting the encrypted data to render it as the subject data, the apparatus including the steps of:
   sequentially generating solutions which are pseudo-random numbers;
   cutting the subject data by a predetermined number of bits into multiple pieces of plain text cut data;
   encrypting the plain text cut data with the algorithm and the key generated based on the solutions per standard number of bits as a standard to render it as the encrypted cut data;
   matching the number of bits of the plain text cut data with the standard number of bits by including dummy data irrelevant to the subject data in the plain text cut data;
   recording the encrypted data having the encrypted cut data connected as one on the recording medium;
   recording specific information for identifying the key used when encrypting the subject data on a predetermined recording medium by associating it with the encrypted data;
   reading the encrypted data recorded on the recording medium from the recording medium;
   cutting the encrypted data into multiple pieces of encrypted cut data by the same number of bits by which the encrypted data is cut when encrypted;

decrypting the encrypted cut data with the algorithm and key used when encrypting the encrypted cut data per the standard number of bits to render it as the plain text cut data;

connecting the decrypted plain text cut data to render it as the subject data; and wherein:

the apparatus cuts the subject data by the number of bits shorter than the standard number of bits so that at least a piece of the plain text cut data has the number of bits different from the other pieces of the plain text cut data, and when decrypting the encrypted cut data, it reads the specific information associated with the encrypted data from the predetermined recording medium and performs the decryption with the algorithm and the key identified based on the specific information.

22. A data processing method executed on a data processing apparatus executing steps of:

encrypting subject data in plain text by using a predetermined algorithm and a predetermined key to render it as encrypted data;

recording the encrypted data on a predetermined recording medium; and decrypting the encrypted data read from the recording medium by using the algorithm and key used when encrypting the encrypted data to render it as the subject data, the apparatus including:

a step of cutting the subject data by a predetermined number of bits into multiple pieces of plain text cut data;

a step of sequentially generating new solutions each time the subject data is encrypted by assigning past solutions to a predetermined solution generating algorithm capable of generating a new solution by assigning at least one of the past solutions thereto;

a first algorithm generating step of sequentially generating new algorithms each time the subject data is encrypted by using the generated solutions;

a step of matching the number of bits of the plain text cut data with the standard number of bits as a standard by including dummy data irrelevant to the subject data in the plain text cut data;

a step of encrypting the plain text cut data with the key and the algorithm generated in the first algorithm generating step per the standard number of bits to render it as the encrypted cut data;

a step of recording the encrypted data having the encrypted cut data connected as one on the recording medium;

a step of reading the encrypted data recorded on the recording medium from the recording medium;

a second algorithm generating step of sequentially generating the same new algorithms as those generated in the first algorithm generating step each time the encrypted data is decrypted by using the generated solutions;

a step of cutting the encrypted data into multiple pieces of encrypted cut data by the same number of bits by which the encrypted data is cut when encrypted;

a step of decrypting the encrypted cut data with the key used when encrypting the encrypted cut data and the same algorithm as that used when encrypting the encrypted data generated in the second algorithm generating step per the standard number of bits to render it as the plain text cut data;

a step of connecting the decrypted plain text cut data to render it as the subject data; and wherein:

the apparatus encrypts multiple pieces of the subject data to render them as the encrypted data, decrypts multiple pieces of the encrypted data in the same order as the order used on encryption thereof and cuts the subject data by the number of bits shorter than the standard number of bits.

23. A data processing method executed on a data processing apparatus executing steps of:

encrypting subject data in plain text by using a predetermined algorithm and a predetermined key to render it as encrypted data;

recording the encrypted data on a predetermined recording medium; and decrypting the encrypted data read from the recording medium by using the algorithm and key used when encrypting the encrypted data to render it as the subject data, the apparatus including:

a step of cutting the subject data by a predetermined number of bits into multiple pieces of plain text cut data;

a step of sequentially generating new solutions each time the subject data is encrypted by assigning past solutions to a predetermined solution generating algorithm capable of generating a new solution by assigning at least one of the past solutions thereto;

a first key generating step of sequentially generating new keys each time the subject data is encrypted by using the generated solutions;

a step of matching the number of bits of the plain text cut data with the standard number of bits as a standard by including dummy data irrelevant to the subject data in the plain text cut data;

a step of encrypting the plain text cut data with the algorithm and the key generated in the first key generating step per the standard number of hits to render it as the encrypted cut data;

a step of recording the encrypted data having the encrypted cut data connected as one on the recording medium;

a step of reading the encrypted data recorded on the recording medium from the recording medium;

a second key generating step of sequentially generating the same new keys as those generated in the first key generating step each time the encrypted data is decrypted by using the generated solutions;

a step of cutting the encrypted data into multiple pieces of encrypted cut data by the same number of bits by which the encrypted data is cut when encrypted;

a step of decrypting the encrypted cut data with the algorithm used when encrypting the encrypted cut data and the same key as that used when encrypting the encrypted data generated in the second key generating step per the standard number of bits to render it as the plain text cut data;

a step of connecting the decrypted plain text cut data to render it as the subject data; and wherein:

the apparatus encrypts multiple pieces of the subject data to render them as the encrypted data, decrypts multiple pieces of the encrypted data in the same order as the order used on encryption thereof and cuts the subject data by the number of bits shorter than the standard number of bits.

24. A data processing method executed on a data processing apparatus executing steps of:

encrypting subject data in plain text by using a predetermined algorithm and a predetermined key to render it as encrypted data;

recording the encrypted data on a predetermined recording medium; and decrypting the encrypted data read from the recording medium by using the algorithm and key used when encrypting the encrypted data to render it as the subject data, the apparatus including:

a step of cutting the subject data by a predetermined number of bits into multiple pieces of plain text cut data;

a first solution generating step of sequentially generating new solutions each time the subject data is encrypted by assigning past solutions to a predetermined solution generating algorithm capable of generating a new solution by assigning at least one of the past solutions thereto;

a step of matching the number of bits of the plain text cut data with the standard number of bits as a standard by including dummy data irrelevant to the subject data in the plain text cut data;

a first algorithm generating step of sequentially generating new algorithms each time the subject data is encrypted by using the solutions generated in the first solution generating step;

a step of encrypting the plain text cut data with the key and the algorithm generated in the first algorithm generating step per the standard number of bits to render it as the encrypted cut data;

a step of recording the encrypted data having the encrypted cut data connected as one on the recording medium;

a step of reading the encrypted data recorded on the recording medium from the recording medium;

a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto;

a second algorithm generating step of sequentially generating the same new algorithms as those generated in the first algorithm generating step each time the encrypted data is decrypted by using the solutions generated in the second solution generating step;

a step of cutting the encrypted data into multiple pieces of encrypted cut data by the same number of bits by which the encrypted data is cut when encrypted;

a step of decrypting the encrypted cut data with the key used when encrypting the encrypted cut data and the same algorithm as that used when encrypting the encrypted data generated in the second algorithm generating step per the standard number of bits to render it as the plain text cut data;

a step of connecting the decrypted plain text cut data to render it as the subject data; and wherein:

the apparatus encrypts multiple pieces of the subject data to render them as the encrypted data, decrypts multiple pieces of the encrypted data in the same order as the order used on encryption thereof and cuts the subject data by the number of bits shorter than the standard number of bits, 25. A data processing method executed on a data processing apparatus executing steps of:

encrypting subject data in plain text by using a predetermined algorithm and a predetermined key to render it as encrypted data;

recording the encrypted data on a predetermined recording medium; and decrypting the encrypted data read from the recording medium by using the algorithm and key used when encrypting the encrypted data to render it as the subject data, the apparatus including:

a step of cutting the subject data by a predetermined number of bits into multiple pieces of plain text cut data;

a first solution generating step of sequentially generating new solutions each time the subject data is encrypted by assigning past solutions to a predetermined solution generating algorithm capable of generating a new solution by assigning at least one of the past solutions thereto;

a first key generating step of sequentially generating new keys each time the subject data is encrypted by using the solutions generated in the first solution generating step;

a step of matching the number of bits of the plain text cut data with the standard number of bits as a standard by including dummy data irrelevant to the subject data in the plain text cut data;

a step of encrypting the plain text cut data with the algorithm and the key generated in the first key generating step per the standard number of bits to render it as the encrypted cut data;

a step of recording the encrypted data having the encrypted cut data connected as one on the recording medium;

a step of reading the encrypted data recorded on the recording medium from the recording medium;

a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto;

a second key generating step of sequentially generating the same new keys as those generated in the first key generating step each time the encrypted data is decrypted by using the solutions generated in the second solution generating step;

a step of cutting the encrypted data into multiple pieces of encrypted cut data by the same number of bits by which the encrypted data is cut when encrypted;

a step of decrypting the encrypted cut data with the algorithm used when encrypting the encrypted cut data and the same key as that used when encrypting the encrypted data generated in the second key generating step per the standard number of bits to render it as the plain text cut data;

a step of connecting the decrypted plain text cut data to render it as the subject data; and wherein:

the apparatus encrypts multiple pieces of the subject data to render them as the encrypted data, decrypts multiple pieces of the encrypted data in the same order as the order used on encryption thereof and cuts the subject data by the number of bits shorter than the standard number of bits.

26. A data processing method executed on a data processing apparatus executing steps of:

encrypting subject data in plain text by using a predetermined algorithm and a predetermined key to render it as encrypted data;

recording the encrypted data on a predetermined recording medium; and decrypting the encrypted data read from the recording medium by using the algorithm and key used when encrypting the encrypted data to render it as the subject data, the apparatus including:

a step of cutting the subject data by a predetermined number of bits into multiple pieces of plain text cut data;

a first solution generating step of sequentially generating new solutions each time the subject data is encrypted by assigning past solutions to a predetermined solution generating algorithm capable of generating a new solution by assigning at least one of the past solutions thereto;

a step of matching the number of bits of the plain text cut data with the standard number of bits as a standard by including dummy data irrelevant to the subject data in the plain text cut data;

a first algorithm generating step of sequentially generating new algorithms each time the subject data is encrypted by using the solutions generated in the first solution generating step;

a step of encrypting the plain text cut data with the key and the algorithm generated in the first algorithm generating step per the standard number of bits to render it as the encrypted cut data;

a step of recording the encrypted data having the encrypted cut data connected as one on the recording medium;

a step of reading the encrypted data recorded on the recording medium from the recording medium;

a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto;

a second algorithm generating step of sequentially generating the same new algorithms as those generated in the first algorithm generating step each time the encrypted data is decrypted by using the solutions generated in the second solution generating step;

a step of cutting the encrypted data into multiple pieces of encrypted cut data by the same number of bits by which the encrypted data is cut when encrypted;

a step of decrypting the encrypted cut data with the key used when encrypting the encrypted cut data and the same algorithm as that used when encrypting the encrypted data generated in the second algorithm generating step per the standard number of bits to render it as the plain text cut data;

a step of connecting the decrypted plain text cut data to render it as the subject data; and wherein:

the apparatus encrypts multiple pieces of the subject data to render them as the encrypted data, decrypts multiple pieces of the encrypted data in the same order as the order used on encryption thereof and cuts the subject data to have the number of bits shorter than the standard number of bits so that at least a piece of the plain text cut data has the number of bits different from the other pieces of the plain text cut data.

27. A data processing method executed on a data processing apparatus executing steps of:

encrypting subject data in plain text by using a predetermined algorithm and a predetermined key to render it as encrypted data;

recording the encrypted data on a predetermined recording medium; and decrypting the encrypted data read from the recording medium by using the algorithm and key used when encrypting the encrypted data to render it as the subject data, the apparatus including:

a step of cutting the subject data by a predetermined number of bits into multiple pieces of plain text cut data;

a first solution generating step of sequentially generating new solutions each time the subject data is encrypted by assigning past solutions to a predetermined solution generating algorithm capable of generating a new solution by assigning at least one of the past solutions thereto;

a first key generating step of sequentially generating new keys each time the subject data is encrypted by using the solutions generated in the first solution generating step;

a step of matching the number of bits of the plain text cut data with the standard number of bits as a standard by including dummy data irrelevant to the subject data in the plain text cut data;

a step of encrypting the plain text cut data with the algorithm and the key generated in the first key generating step per the standard number of bits to render it as the encrypted cut data;

a step of recording the encrypted data having the encrypted cut data connected as one on the recording medium;

a step of reading the encrypted data recorded on the recording medium from the recording medium;

a second solution generating step of sequentially generating the same new solutions as those generated in the first solution generating step each time the encrypted data is decrypted by assigning past solutions to a predetermined solution generating algorithm capable of generating a new solution by assigning at least one of the past solutions thereto;

a second key generating step of sequentially generating the same new keys as those generated in the first key generating step each time the encrypted data is decrypted by using the solutions generated in the second solution generating step;

a step of cutting the encrypted data into multiple pieces of encrypted cut data by the same number of bits by which the encrypted data is cut when encrypted;

a step of decrypting the encrypted cut data with the algorithm used when encrypting the encrypted cut data and the same key as that used when encrypting the encrypted data generated in the second key generating step per the standard number of bits to render it as the plain text cut data;

a step of connecting the decrypted plain text cut data to render it as the subject data; and wherein:

the apparatus encrypts multiple pieces of the subject data to render them as the encrypted data, decrypts multiple pieces of the encrypted data in the same order as the order used on encryption thereof and cuts the subject data to have the number of bits shorter than the standard number of bits so that at least a piece of the plain text cut data has the number of bits different from the other pieces of the plain text cut data.

* * * * *